(12) United States Patent
Inukai et al.

(10) Patent No.: US 9,759,899 B2
(45) Date of Patent: Sep. 12, 2017

(54) ZOOM LENS AND IMAGING APPARATUS

(71) Applicant: FUJIFILM Corporation, Tokyo (JP)

(72) Inventors: Hajime Inukai, Saitama (JP); Michio Cho, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/254,000

(22) Filed: Sep. 1, 2016

(65) Prior Publication Data
US 2017/0068073 A1 Mar. 9, 2017

(30) Foreign Application Priority Data
Sep. 7, 2015 (JP) .................. 2015-175691

(51) Int. Cl.
| | |
|---|---|
| *G02B 15/14* | (2006.01) |
| *G02B 9/60* | (2006.01) |
| *G02B 15/17* | (2006.01) |
| *G02B 27/00* | (2006.01) |
| *G02B 15/15* | (2006.01) |
| *G02B 15/22* | (2006.01) |

(Continued)

(52) U.S. Cl.
CPC ................ *G02B 15/17* (2013.01); *G02B 3/04* (2013.01); *G02B 5/005* (2013.01); *G02B 9/00* (2013.01); *G02B 9/34* (2013.01); *G02B 9/60* (2013.01); *G02B 13/006* (2013.01); *G02B 13/009* (2013.01); *G02B 13/0045* (2013.01); *G02B 13/18* (2013.01); *G02B 15/14* (2013.01); *G02B 15/15* (2013.01); *G02B 15/16* (2013.01); *G02B 15/20* (2013.01); *G02B 15/22* (2013.01); *G02B 27/0025* (2013.01)

(58) Field of Classification Search
CPC .... G02B 27/0025; G02B 15/20; G02B 13/18; G02B 9/34; G02B 13/009; G02B 13/0045; G02B 15/14; G02B 15/16; G02B 5/005; G02B 9/60; G02B 13/006; G02B 15/15; G02B 15/22; G02B 3/04; G02B 9/00

USPC ................. 359/683–686, 688, 715, 740, 775
See application file for complete search history.

(56) References Cited

U.S. PATENT DOCUMENTS 3,885,862 A * 5/1975 Fujioka .................. G02B 15/17
359/688
4,390,248 A * 6/1983 Ikemori ................. G02B 13/12
359/688

(Continued)

FOREIGN PATENT DOCUMENTS

JP 2006-030582 A 2/2006

*Primary Examiner* — Evelyn A Lester
(74) *Attorney, Agent, or Firm* — Studebaker & Brackett PC

(57) ABSTRACT

A zoom lens is constituted by, in order from the object side to the image side: a positive first group which is fixed when changing magnification, a negative second lens group which moves when changing magnification, a negative third lens group which moves when changing magnification, and a positive fourth lens group which is fixed when changing magnification. The first lens group is constituted by a 1*a* lens of a negative meniscus shape, a positive 1*b* lens, and a positive 1*c* lens. The second lens group is constituted by a negative 2*a* lens, a biconcave 2*b* lens, a positive 2*c* lens, and a negative 2*d* lens. The third lens group is constituted by a negative 3*a* lens and a positive 3*b* lens. The fourth lens group includes a 4*a* lens, an aperture stop, and a positive 4*b* lens, which are consecutively provided from the most object side thereof.

18 Claims, 15 Drawing Sheets

(51) Int. Cl.
*G02B 15/20* (2006.01)
*G02B 9/34* (2006.01)
*G02B 9/00* (2006.01)
*G02B 5/00* (2006.01)
*G02B 15/16* (2006.01)
*G02B 13/18* (2006.01)
*G02B 3/04* (2006.01)
*G02B 13/00* (2006.01)

(56) References Cited

U.S. PATENT DOCUMENTS

| | | | | |
|---|---|---|---|---|
| 4,497,547 A * | 2/1985 | Hayashi | ............... | G02B 15/14 359/688 |
| 5,056,900 A * | 10/1991 | Mukaiya | ............... | G02B 15/17 359/676 |
| 5,059,007 A * | 10/1991 | Tanaka | ............... | G02B 15/173 359/676 |
| 5,221,995 A * | 6/1993 | Yaneyama | ............... | G02B 15/17 359/688 |
| 5,225,937 A * | 7/1993 | Horiuchi | ............... | G02B 15/17 359/676 |
| 5,371,630 A * | 12/1994 | Ito | ............... | G02B 15/173 359/684 |
| 5,666,230 A * | 9/1997 | Tatsuno | ............... | G02B 15/16 359/684 |
| 5,760,969 A * | 6/1998 | Suzuki | ............... | G02B 15/17 359/688 |
| 6,141,157 A * | 10/2000 | Nurishi | ............... | G02B 15/17 359/686 |
| 2009/0086321 A1* | 4/2009 | Mizuguchi | ............... | G02B 27/646 359/557 |
| 2015/0130961 A1* | 5/2015 | Sudoh | ............... | G02B 15/17 348/220.1 |
| 2015/0212303 A1* | 7/2015 | Ohashi | ............... | G02B 27/0062 348/240.3 |
| 2015/0237265 A1* | 8/2015 | Sudoh | ............... | G02B 15/173 348/240.3 |
| 2015/0241657 A1* | 8/2015 | Saori | ............... | G02B 15/177 348/240.3 |

* cited by examiner

FIG.1 EXAMPLE 1

FIG.3 EXAMPLE 3

FIG.4  EXAMPLE 4

FIG.5    EXAMPLE 5

FIG.6 EXAMPLE 6

FIG.8
EXAMPLE 1
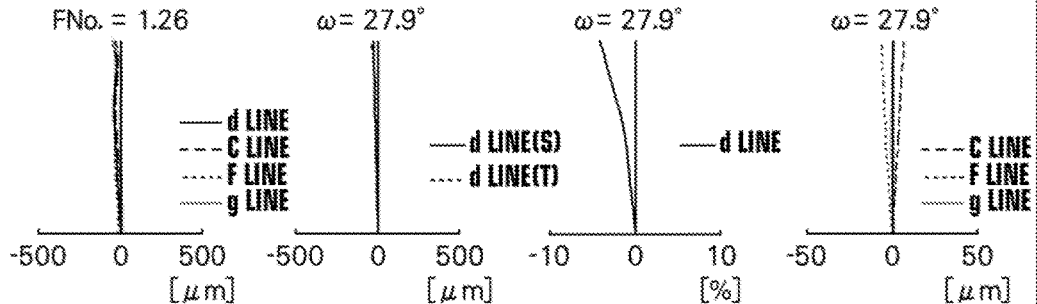
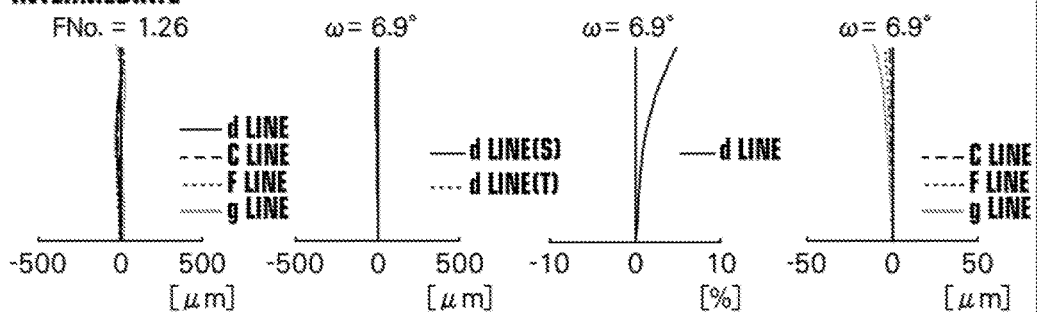
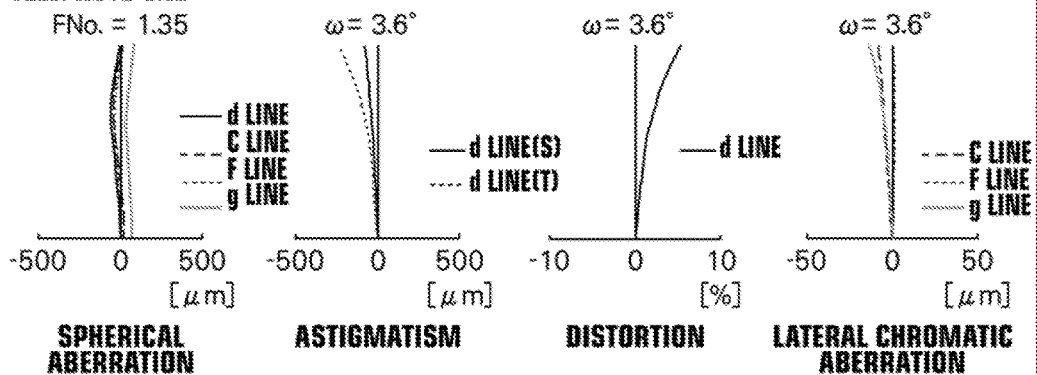

FIG.9
EXAMPLE 2
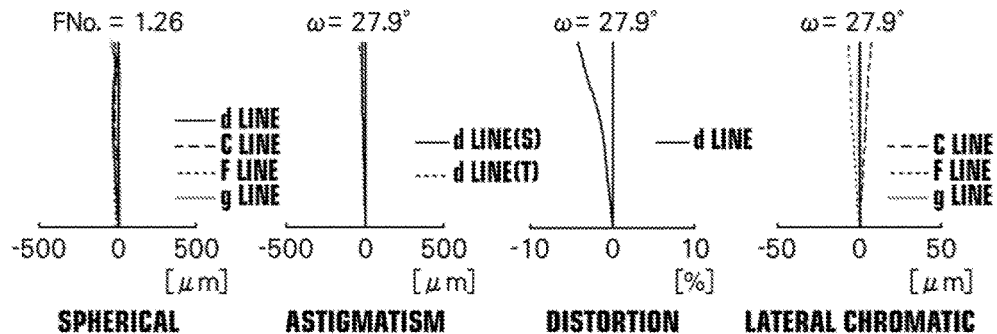
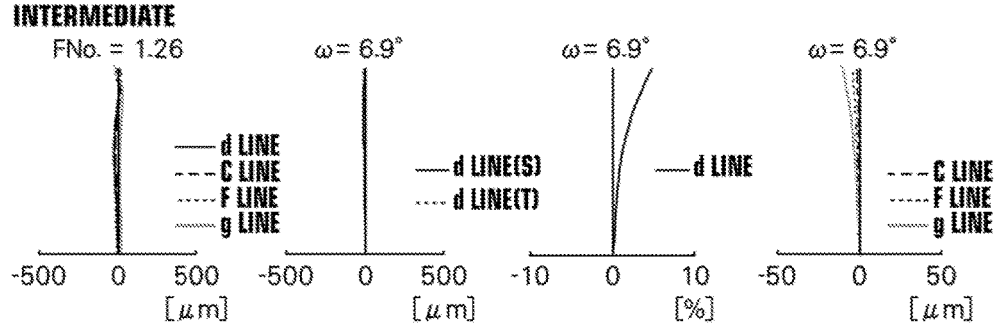
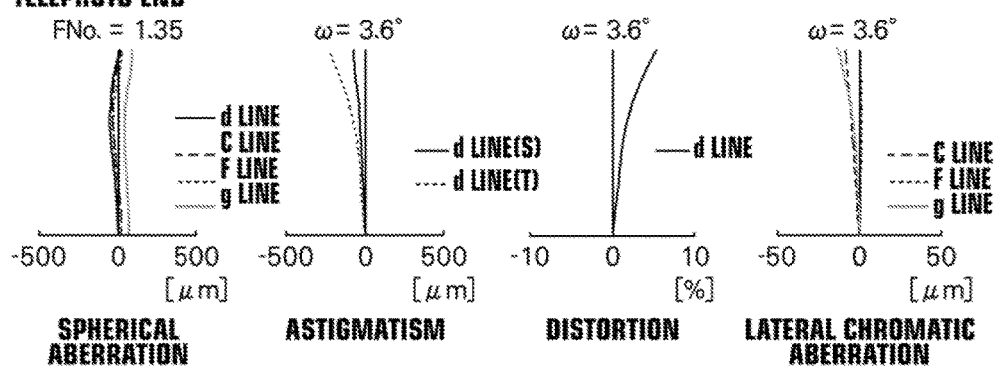

FIG.10
EXAMPLE 3
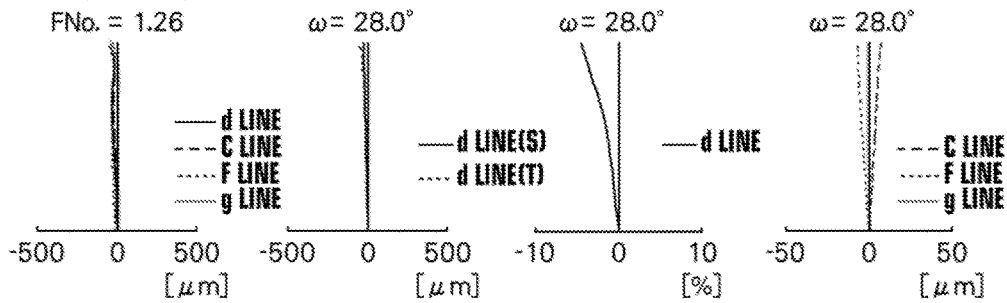
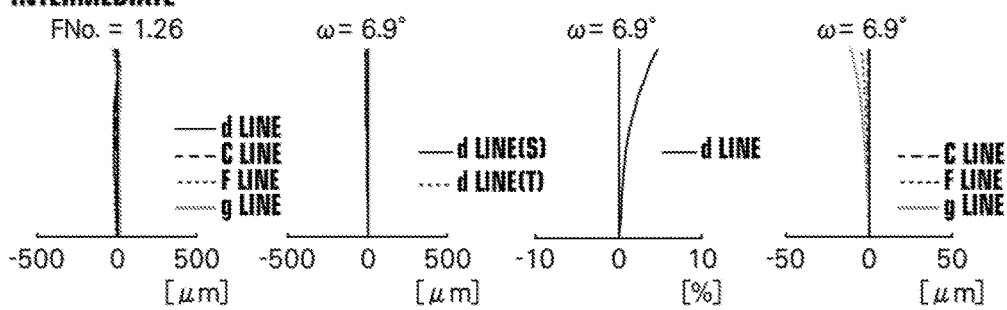
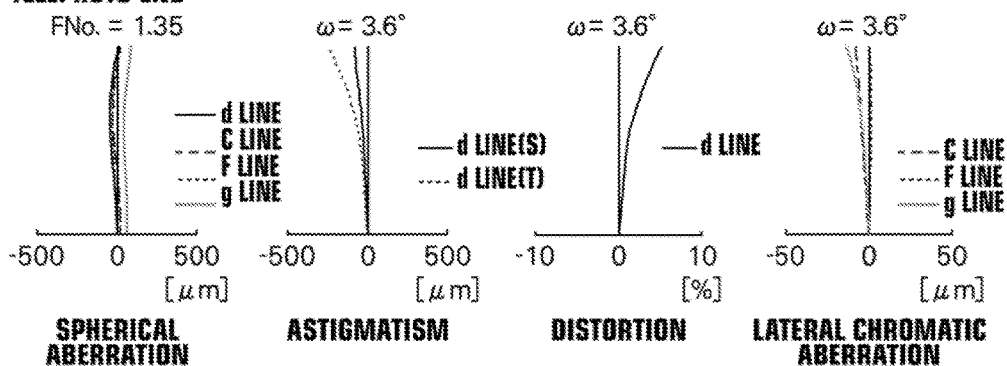

FIG.11 EXAMPLE 4
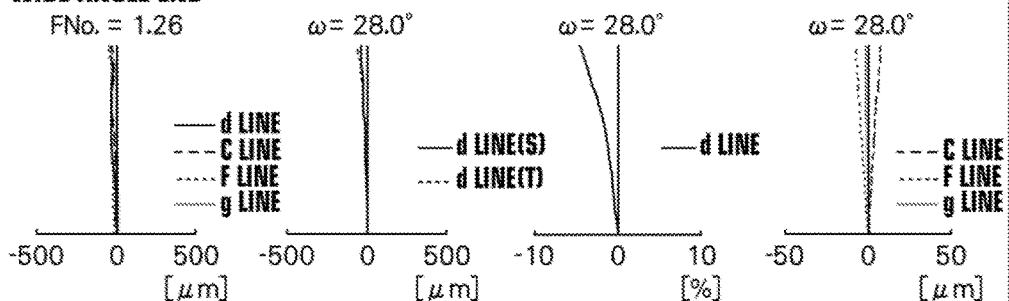
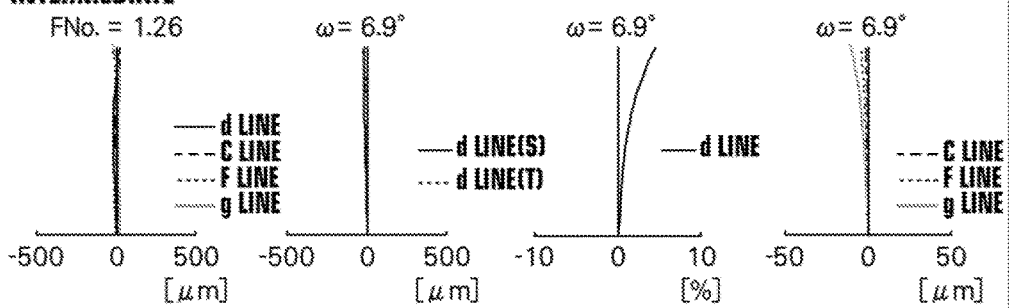
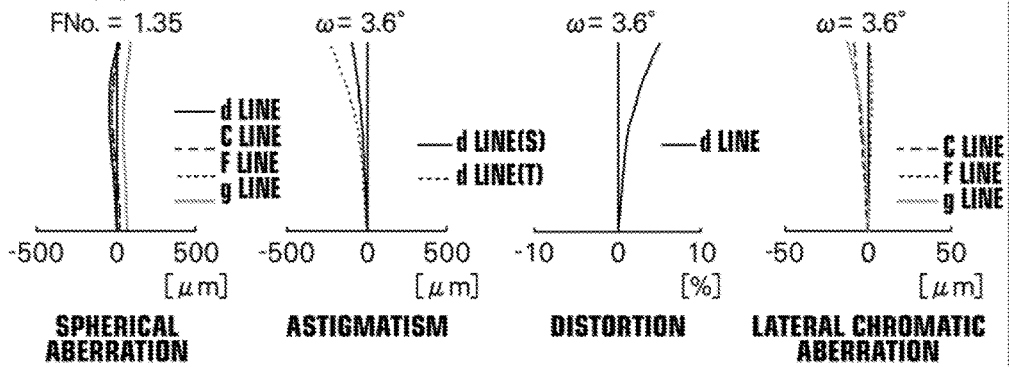

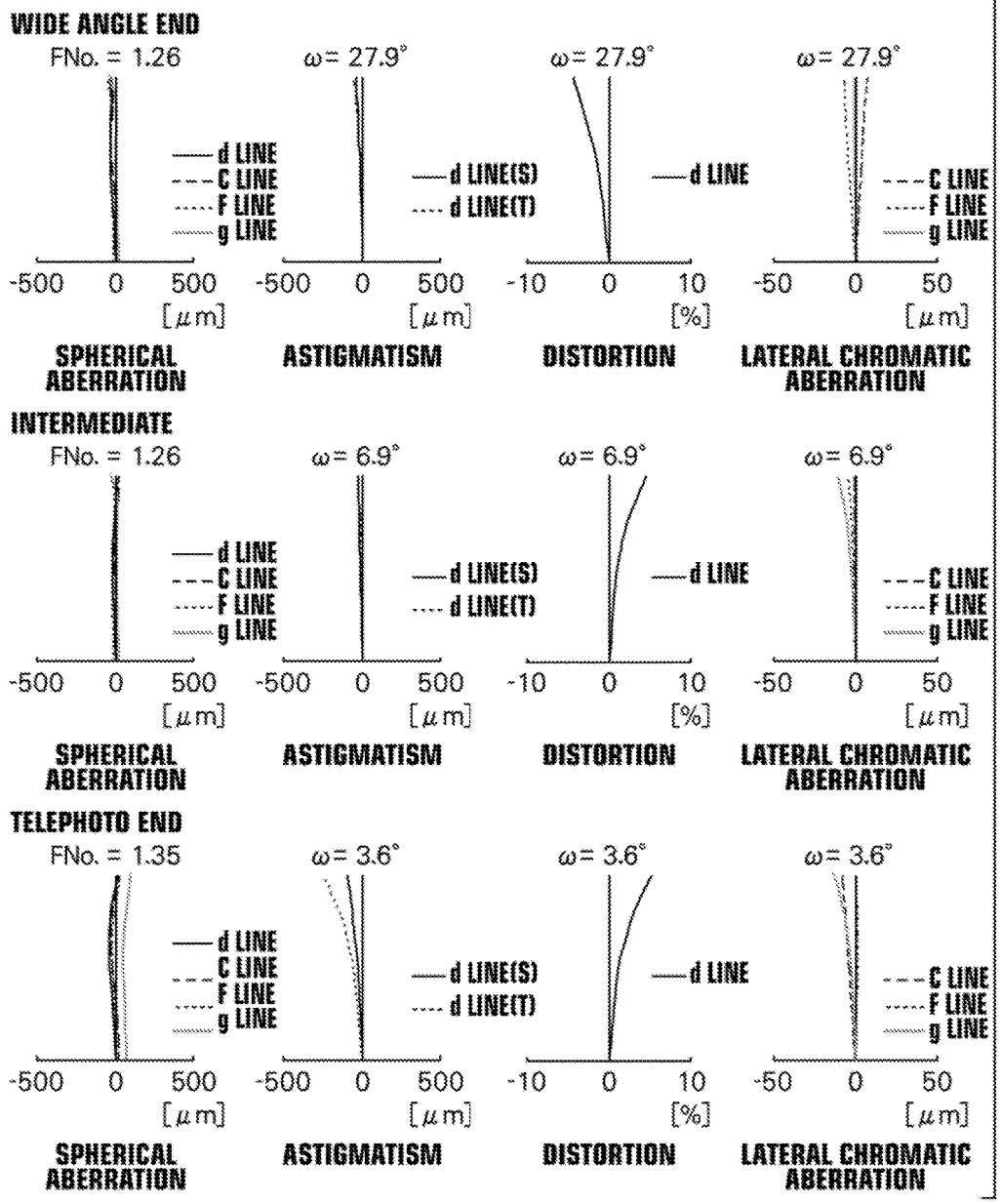

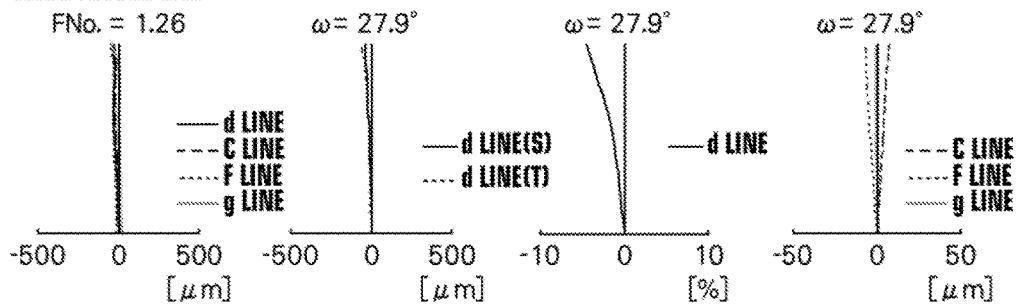
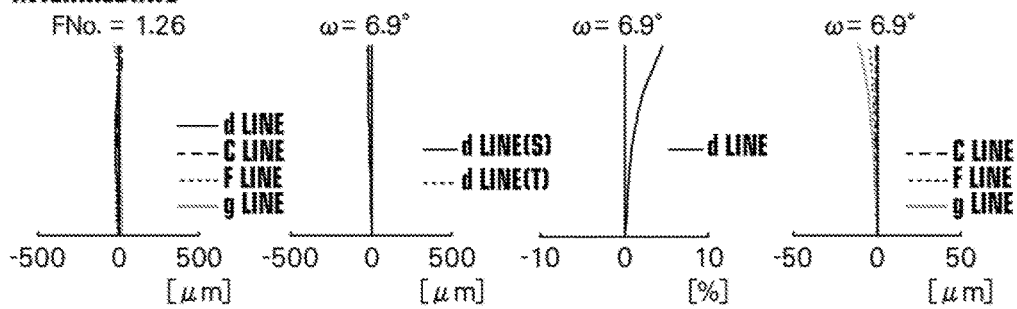
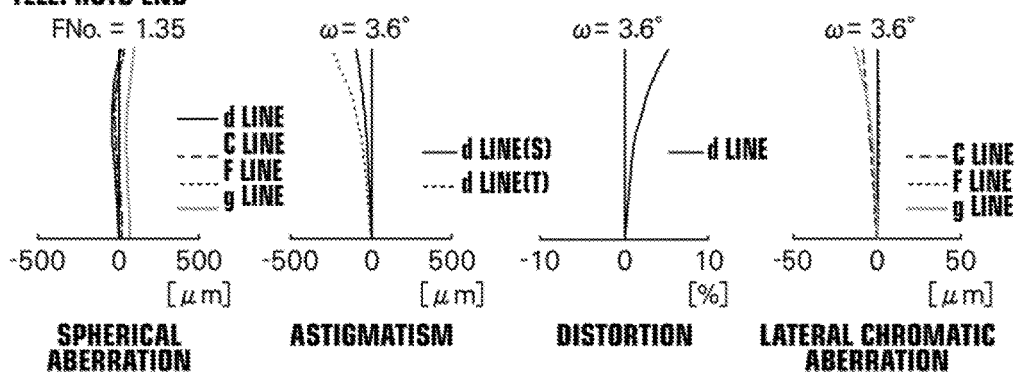
FIG.13 EXAMPLE 6

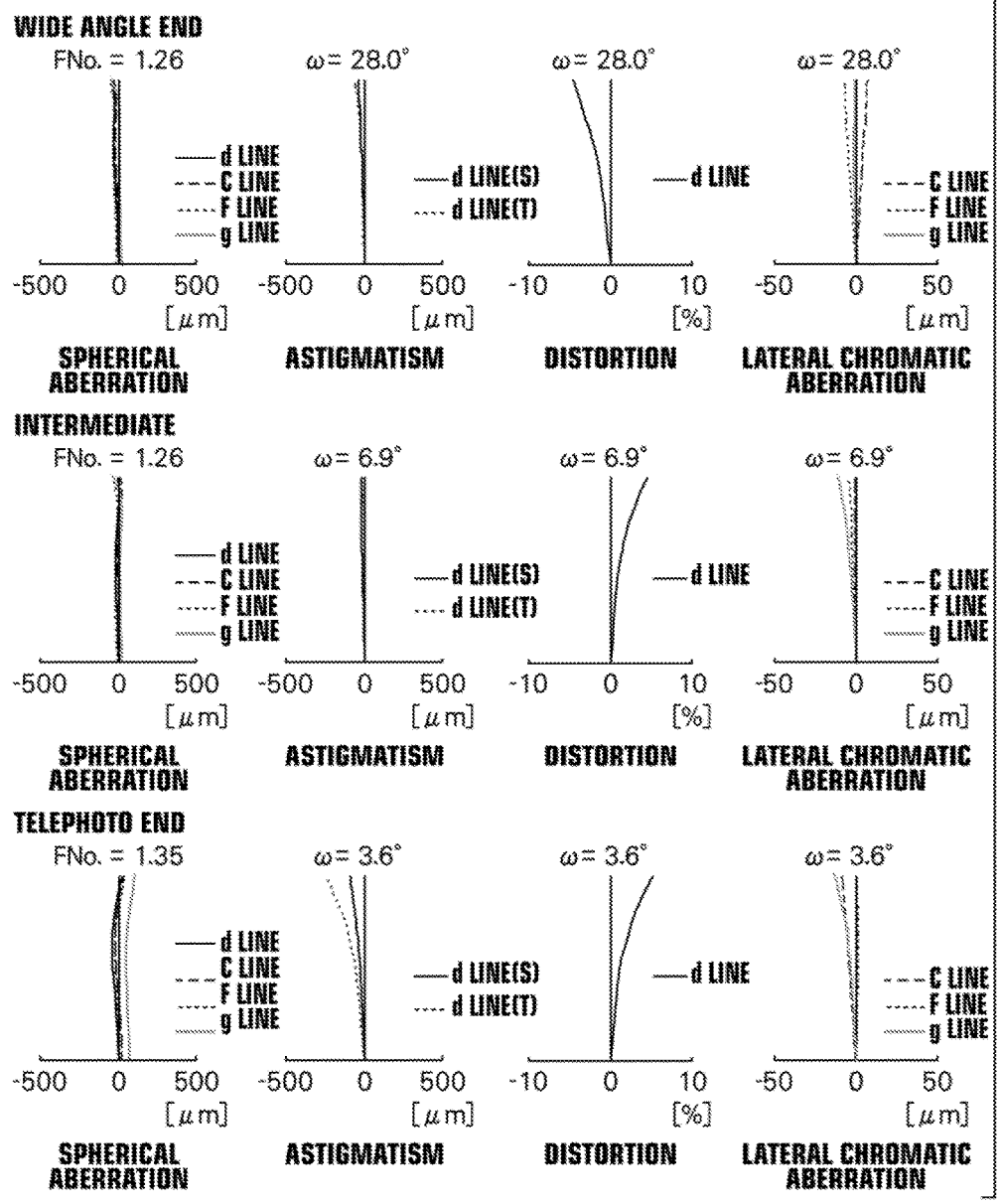

ZOOM LENS AND IMAGING APPARATUS

CROSS REFERENCE TO RELATED APPLICATIONS

The present application claims priority under 35 U.S.C. §119 to Japanese Patent Application No. 2015-175691 filed on Sep. 7, 2015. The above application is hereby expressly incorporated by reference in its entirety, into the present application.

BACKGROUND

The present disclosure is related to a zoom lens which can be utilized in electronic cameras such as a digital camera, a video camera, a broadcast camera, a surveillance camera, etc., and to an imaging apparatus equipped with this zoom lens.

A common configuration for zoom lenses for use in electronic cameras such as a digital camera, a video camera, a broadcast camera, a surveillance camera, etc. is that constituted by a first lens group having a positive refractive power, a second lens group having a negative refractive power, a third lens group having a negative refractive power, and a fourth lens group having a positive refractive power. When changing magnification, the first lens group and the fourth lens group are fixed with respect to an imaging plane. This configuration can realize both zoom magnification rates and miniaturization with a comparatively simple structure. A zoom lens having such a structure is disclosed in Japanese Unexamined Patent Publication No. 2006-030582.

SUMMARY

However, it is difficult to achieve a small F number throughout the entire zoom range with a small number of lenses in a zoom lens having the configuration described above. The zoom lens of Japanese Unexamined Patent Publication No. 2006-030582 has a sufficiently small F number at the wide angle end, but there is a problem that the F number at the telephoto end is large.

The present disclosure has been developed in view of the foregoing circumstances. The present disclosure provides a zoom lens having a small F number throughout the entire zoom range and an imaging apparatus equipped with this zoom lens.

A zoom lens of the present disclosure consists of, in order from the object side to the image side:
 a first lens group having a positive refractive power;
 a second lens group having a negative refractive power;
 a third lens group having a negative refractive power; and
 a fourth lens group having a positive refractive power;
 the first lens group and the fourth lens group being fixed when changing magnification;
 the second lens group moving from the object side to the image side when changing magnification from the wide angle end to the telephoto end;
 the third lens group moving to correct fluctuations in an image formation position caused by the movement of the second lens group;
 the first lens group consisting of, in order from the object side to the image side, a $1a$ lens of a negative meniscus shape with a concave surface toward the image side, a $1b$ lens having a positive refractive power, and a $1c$ lens having a positive refractive power and in which the surface thereof toward the object side has a radius of curvature with a smaller absolute value than the surface thereof toward the image side;
 the second lens group consisting of, in order from the object side to the image side, a $2a$ lens having a negative refractive power and in which the surface thereof toward the image side has a radius of curvature with a smaller absolute value than the surface thereof toward the object side, a $2b$ lens of a biconcave shape, a $2c$ lens having a positive refractive power and in which the surface thereof toward the object side has a radius of curvature with a smaller absolute value than the surface thereof toward the image side, and a $2d$ lens having a negative refractive power;
 the third lens group consisting of, in order from the object side to the image side, a $3a$ lens having a negative refractive power and in which the surface thereof toward the object side has a radius of curvature with a smaller absolute value than the surface thereof toward the image side, and a $3b$ lens having a positive refractive power and in which the surface thereof toward the object side has a radius of curvature with a smaller absolute value than the surface thereof toward the image side; and the fourth lens group comprises, consecutively in order from the most object side thereof, a $4a$ lens of a positive meniscus shape, a stop, and a $4b$ lens having a positive refractive power and in which the surface thereof toward the object side has a radius of curvature with a smaller absolute value than the surface thereof toward the image side.

In the zoom lens of the present disclosure, it is preferable for the $2a$ lens and the $2b$ lens to be cemented together.

In addition, it is preferable for the $3a$ lens and the $3b$ lens to be cemented together.

In addition, it is preferable for Conditional Formula (1) below to be satisfied. Note that it is more preferable for Conditional Formula (1-1) below to be satisfied.

$$0.3<(r4af-r4ar)/(r4af+r4ar)<0.9 \quad (1)$$

$$0.4<(r4af-r4ar)/(r4af+r4ar)<0.8 \quad (1\text{-}1)$$

wherein r4af is the radius of curvature of the surface toward the object side of the $4a$ lens, and r4ar is the radius of curvature of the surface toward the image side of the $4a$ lens.

In addition, it is preferable for Conditional Formula (2) below to be satisfied. Note that it is more preferable for Conditional Formula (2-1) below to be satisfied.

$$-3<(r4bf+r4br)/(r4bf-r4br)<-1.2 \quad (2)$$

$$-2.5<(r4bf+r4br)/(r4bf-r4br)<-1.4 \quad (2\text{-}1)$$

wherein r4bf is the radius of curvature of the surface toward the object side of the $4b$ lens, and r4br is the radius of curvature of the surface toward the image side of the $4b$ lens.

In addition, it is preferable for Conditional Formula (3) below to be satisfied. Note that it is more preferable for Conditional Formula (3-1) below to be satisfied.

$$0.2<(r2bf+r2br)/(r2bf-r2br)<0.8 \quad (3)$$

$$0.45<(r2bf+r2br)/(r2bf-r2br)<0.6 \quad (3\text{-}1)$$

wherein r2bf is the radius of curvature of the surface toward the object side of the $2b$ lens, and r2br is the radius of curvature of the surface toward the image side of the $2b$ lens.

In addition, it is preferable for Conditional Formula (4) below to be satisfied. Note that it is more preferable for Conditional Formula (4-1) below to be satisfied.

$$-2.5 < (r2df - r2dr)/(r2df + r2dr) < -0.4 \quad (4)$$

$$-2 < (r2df - r2dr)/(r2df + r2dr) < -0.6 \quad (4\text{-}1)$$

wherein r2df is the radius of curvature of the surface toward the object side of the 2d lens, and r2dr is the radius of curvature of the surface toward the image side of the 2d lens.

In addition, it is preferable for Conditional Formula (5) below to be satisfied. Note that it is more preferable for Conditional Formula (5-1) below to be satisfied.

$$0.4 < f4/f4a < 1 \quad (5)$$

$$0.5 < f4/f4a < 0.85 \quad (5\text{-}1)$$

wherein f4 is the focal length of the fourth lens group with respect to the d line, and f4a is the focal length of the 4a lens with respect to the d line.

In addition, it is preferable for Conditional Formula (6) below to be satisfied. Note that it is more preferable for Conditional Formula (6-1) below to be satisfied.

$$1.5 < f4b/f4a < 3 \quad (6)$$

$$1.8 < f4b/f4a < 2.5 \quad (6\text{-}1)$$

wherein f4b is the focal length of the 4b lens with respect to the d line, and f4a is the focal length of the 4a lens with respect to the d line.

In the case that the 3a lens and the 3b lens are cemented together, it is preferable for Conditional Formula (7) below to be satisfied. Note that it is more preferable for Conditional Formula (7-1) below to be satisfied.

$$-0.2 < f3/r3ar \cdot ((1-n3a)/v3a + (n3b-1)/v3b) < -0.04 \quad (7)$$

$$-0.15 < f3/r3ar \cdot ((1-n3a)/v3a + (n3b-1)/v3b) < -0.06 \quad (7\text{-}1)$$

wherein f3 is the focal length of the third lens group with respect to the d line, r3ar is the radius of curvature of the surface toward the image side of the 3a lens, n3a is the refractive index of the 3a lens with respect to the d line, v3a is the Abbe's number of the 3a lens with respect to the d line, n3b is the refractive index of the 3b lens with respect to the d line, and v3b is the Abbe's number of the 3b lens with respect to the d line.

Here, Conditional Formula (7) will be described in detail.

First, the refractive power (1/f) of a surface is represented by the formula below.

$$(N1-N0)/r$$

wherein N0 is the refractive index of the surface toward the object side, N1 is the refractive index of the surface toward the image side, and r is the radius of curvature of the surface.

Meanwhile, the Abbe's number v is an inverse of dispersion. Therefore, the amount of longitudinal chromatic aberration (amount of correction) which is generated by the surface is represented by the formula below. However, this numerical value is influenced by the height of paraxial marginal light rays. Therefore, this numerical value is an approximation for a case in which the radius of curvature, the refractive index, or the Abbe's number related to a specific surface is changed.

$$(N1-N0)/r \cdot (1/v)$$

If the above formula is applied to the surface toward the image side of the 3a lens and the surface toward the object side of the 3b lens (the medium toward the image side of the surface toward the image side of the 3a lens and the medium toward the object side of the surface toward the object side of the 3b lens are air), and r3bf is the radius of curvature of the surface toward the object side of the 3b lens, they will be represented by the following formulae.

$$(1-n3a)/r3ar \cdot (1/v3a)$$

$$(n3b-1)/r3bf \cdot (1/v3b)$$

In the case that the 3a lens and the 3b lens are cemented together, r3ar=r3bf. Therefore, the sums thereof will respectively be represented by the formula below. Note that in the case that the sign of this numerical value is +, an operative effect that causes the F line to become under the d line will be generated, and in the case that the sign of this numerical value is −, an operative effect that causes the F line to become over the d line will be generated. Conditional Formula (7) is the formula below normalized by the focal length of the third lens group with respect to the d line.

$$1/r3ar \cdot ((1-n3a)/v3a + (n3b-1)/v3b)$$

An imaging apparatus of the present disclosure is equipped with the zoom lens of the present disclosure described above.

Note that the above expression "consists of" means that lenses that practically have no power, optical elements other than lenses such as a stop, a mask, a cover glass, and filters, and mechanical components such as lens flanges, a lens barrel, an imaging element, a camera shake correcting mechanism, etc. may be included, in addition to the constituent elements listed above.

The zoom lens of the present disclosure consists of, in order from the object side to the image side: a first lens group having a positive refractive power; a second lens group having a negative refractive power; a third lens group having a negative refractive power; and a fourth lens group having a positive refractive power. The first lens group and the fourth lens group are fixed when changing magnification, the second lens group moves from the object side to the image side when changing magnification from the wide angle end to the telephoto end, and the third lens group moves to correct fluctuations in an image formation position caused by the movement of the second lens group. The first lens group consists of, in order from the object side to the image side, a 1a lens of a negative meniscus shape with a concave surface toward the image side, a 1b lens having a positive refractive power, and a 1c lens having a positive refractive power and in which the surface thereof toward the object side has a radius of curvature with a smaller absolute value than the surface thereof toward the image side. The second lens group consists of, in order from the object side to the image side, a 2a lens having a negative refractive power and in which the surface thereof toward the image side has a radius of curvature with a smaller absolute value than the surface thereof toward the object side, a 2b lens of a biconcave shape, a 2c lens having a positive refractive power and in which the surface thereof toward the object side has a radius of curvature with a smaller absolute value than the surface thereof toward the image side, and a 2d lens having a negative refractive power. The third lens group consists of, in order from the object side to the image side, a 3a lens having a negative refractive power and in which the surface thereof toward the object side has a radius of curvature with a smaller absolute value than the surface thereof toward the image side, and a 3b lens having a positive refractive power and in which the surface thereof toward the object side has a radius of curvature with a smaller absolute value than the surface thereof toward the image side. The fourth lens group comprises, consecutively in order from the most object side thereof, a 4a lens of a positive meniscus shape, a stop, and a 4b lens having a positive refractive power and in which the surface thereof toward the object side has a radius of curvature with a smaller absolute value than the surface thereof toward the image side. Therefore, it is possible to realize a zoom lens having a small F number throughout the entire zoom range.

In addition, the imaging apparatus of the present disclosure is equipped with the zoom lens of the present disclosure. Therefore, the imaging apparatus of the present disclosure is capable of obtaining bright images throughout the entire zoom range.

BRIEF DESCRIPTION OF THE DRAWINGS

FIG. 8 is a collection of diagrams that illustrate various aberrations of the zoom lens of Example 1.

FIG. 9 is a collection of diagrams that illustrate various aberrations of the zoom lens of Example 2.

FIG. 10 is a collection of diagrams that illustrate various aberrations of the zoom lens of Example 3.

FIG. 11 is a collection of diagrams that illustrate various aberrations of the zoom lens of Example 4.

FIG. 12 is a collection of diagrams that illustrate various aberrations of the zoom lens of Example 5.

FIG. 13 is a collection of diagrams that illustrate various aberrations of the zoom lens of Example 6.

FIG. 14 is a collection of diagrams that illustrate various aberrations of the zoom lens of Example 7.

DETAILED DESCRIPTION OF THE PREFERRED EMBODIMENTS

Figure 1:
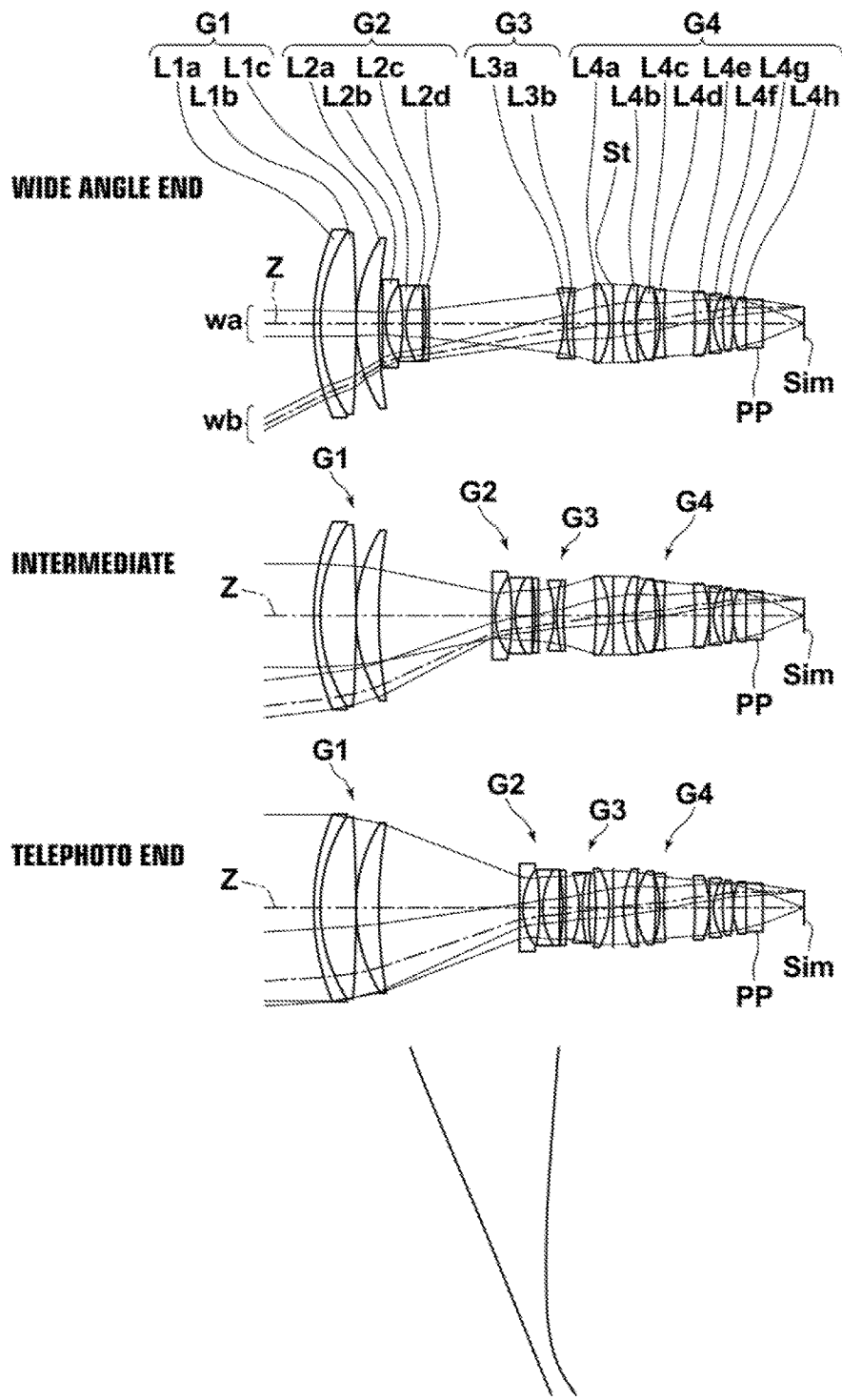
FIG. 1 is a collection of cross sectional diagrams that illustrate the lens configuration of a zoom lens according to an embodiment of the present disclosure (common with a zoom lens of Example 1).

Hereinafter, embodiments of the present disclosure will be described in detail with reference to the attached drawings. FIG. 1 is collection of cross sectional diagrams that illustrate the lens configuration of a zoom lens according to an embodiment of the present disclosure. The example of the configuration illustrated in FIG. 1 corresponds to the configuration of a zoom lens of Example 1 to be described later. In FIG. 1, the left side is the object side, and the right side is the image side. Note that the aperture stop St illustrated in FIG. 1 does not necessarily represent the size or shape thereof, but merely indicates the position of the aperture stop St along an optical axis Z. In addition, FIG. 1 also illustrates an axial light beam wa and a light beam wb at a maximum angle of view.

As illustrated in FIG. 1, this zoom lens is constituted by, in order from the object side to the image side, a first lens group G1 having a positive refractive power; a second lens group G2 having a negative refractive power; a third lens group G3 having a negative refractive power; and a fourth lens group G4 having a positive refractive power. The first lens group G1 and the fourth lens group G4 are fixed when changing magnification, the second lens group G2 moves from the object side to the image side when changing magnification from the wide angle end to the telephoto end, and the third lens group G3 moves to correct fluctuations in an image formation position caused by the movement of the second lens group G2. By adopting this configuration, securing a zoom magnification ratio and miniaturization can both be achieved with a comparatively simple structure compared to a configuration in which the first lens group G1 and the fourth lens group G4 move.

When this zoom lens is applied to an imaging apparatus, it is preferable for a cover glass, a prism, and various filters such as an infrared cutoff filter and a low pass filter to be provided between the optical system and an image formation plane Sim. Therefore, FIG. 1 illustrates an example in which an parallel plate shaped optical member PP that presumes the presence of such components is provided between the lens system and the image formation plane Sim.

The first lens group G1 consists of, in order from the object side to the image side, a 1a lens L1a of a negative meniscus shape with a concave surface toward the image side, a 1b lens L1b having a positive refractive power, and a 1c lens L1c having a positive refractive power and in which the surface thereof toward the object side has a radius of curvature with a smaller absolute value than the surface thereof toward the image side. By adopting this configuration, correction of lateral chromatic aberration at the wide angle end and correction of longitudinal chromatic aberration at the telephoto end can both be realized. Further, the generation of spherical aberration at the telephoto end can be suppressed.

The second lens group G2 consists of, in order from the object side to the image side, a 2a lens L2a having a negative refractive power and in which the surface thereof toward the image side has a radius of curvature with a smaller absolute value than the surface thereof toward the object side, a 2b lens L2b of a biconcave shape, a 2c lens L2c having a positive refractive power and in which the surface thereof toward the object side has a radius of curvature with a smaller absolute value than the surface thereof toward the image side, and a 2d lens L2d having a negative refractive power. Here, the 2a lens L2a exhibits the operational effect of imparting a negative refractive power necessary to change magnification, while suppressing the generation of distortion at the wide angle end. The 2b lens L2b exhibits the operational effect of imparting a negative refractive power necessary to change magnification, while preventing correction of spherical aberration at the telephoto end from becoming excessive. The 2c lens L2c exhibits the operational effects of correcting lateral chromatic aberration at the wide angle end and correcting longitudinal chromatic aberration at the telephoto end. The 2d lens L2d exhibits the operational effect of preventing correction of spherical aberration of marginal rays of light at the telephoto end becoming excessive, by distributing the negative refractive power of the second lens group G2.

The third lens group G3 consists of, in order from the object side to the image side, a 3a lens Lia having a negative refractive power and in which the surface thereof toward the object side has a radius of curvature with a smaller absolute value than the surface thereof toward the image side, and a 3b lens L3b having a positive refractive power and in which the surface thereof toward the object side has a radius of curvature with a smaller absolute value than the surface thereof toward the image side. Here, the 3a lens L3a exhibits the operational effect of imparting a negative refractive power necessary to correct fluctuations in an image formation position caused by changes in magnification, while preventing correction of spherical aberration at the telephoto end from becoming excessive. The 3b lens L3b exhibits he operational effects of correcting excessive correction of spherical aberration at the telephoto end and correcting fluctuations in longitudinal chromatic aberration caused by zooming operations.

The fourth lens group G4 comprises, consecutively in order from the most object side thereof, a 4a lens L4a of a positive meniscus shape, the aperture stop St, and a 4b lens L4b having a positive refractive power and in which the surface thereof toward the object side has a radius of curvature with a smaller absolute value than the surface thereof toward the image side. By configuring the 4a lens L4a to be of this shape, a positive refractive power can be imparted while suppressing the refractive angles of marginal axial rays of light and suppressing the generation of spherical aberration. Further, configuring the 4a lens L4a to be of this shape exhibits the operational effect of causing marginal axial rays of light to become more parallel to the optical axis at the position of the aperture stop St throughout the entire zoom range. In addition, by providing the aperture stop St at the position at which the marginal axial rays of light become closer to parallel to the optical axis, the influence imparted by errors in distances in front of and behind the aperture stop St on the image formation position can be decreased. In addition, configuring the 4b lens L4b to be of this shape exhibits the operative effect of imparting a positive refractive power, while suppressing the refractive angles of marginal rays of light and suppressing the generation of spherical aberration. Further, by consecutively providing the 4a lens L4a and the 4b lens L4b having positive refractive powers, axial rays of light will become convergent while suppressing the generation of spherical aberration. As a result, the diameters of lenses that follow thereafter can be decreased.

The influence of the first lens group G2 is dominant on spherical aberration at the telephoto end. Therefore, suppressing the generation of spherical aberration at the first lens group G1 by distributing the positive refractive power of the first lens group G1 may be considered, if only the F number is to be decreased. However, in the case that the number of lenses that constitute the first lens group G1 is increased, the effective diameter of the first lens group G1 will also increase, and lead to the problem that the weight thereof will become heavy. In addition, the weight balance will be heavy toward the distal end of the lens.

In the zoom lens of the present disclosure, the second lens group G2, the third lens group G3, and the fourth lens group G4 are configured as described above.

Thereby, it is possible for the F number at the telephoto end to be small, without the configuration of the first lens group G1 becoming complex.

In addition, the F number can be decreased without utilizing a DOE (Diffractive Optical Element) or the like even in the case that aspherical lenses are not employed and all of the lenses are spherical lenses. Therefore, cost and requirements for assembly precision can be suppressed.

Further, by configuring the zoom lens such that the shapes and refractive powers of the components in front of and behind the aperture stop St (the entire second lens group G2, the entire third lens group G3, and the two lenses most toward the object side within the fourth lens group G4) at the telephoto end are set appropriately, spherical aberration at the telephoto end can be favorably corrected, and the F number at the telephoto end can be decreased.

In the zoom lens of the present embodiment, it is preferable for the 2b lens L2b and the 2c lens L2c to be cemented together. By adopting this configuration, the generation of higher order aberrations can be suppressed, while the absolute values of the radius of curvature of the surface toward the image side of the 2b lens L2b and the radius of curvature of the surface toward the object side of the 2c lens L2c can be decreased. Therefore, this configuration is advantageous from the viewpoint of correcting lateral chromatic aberration at the wide angle end and longitudinal chromatic aberration at the telephoto end.

In addition, it is preferable for the 3a lens L3a and the 3b lens L3b to be cemented together. By adopting this configuration, the generation of higher order aberrations can be suppressed, while the absolute values of the radius of curvature of the surface toward the image side of the 3a lens L3a and the radius of curvature of the surface toward the object side of the 3b lens L3b can be decreased. Therefore, this configuration is advantageous from the viewpoint of suppressing fluctuations in longitudinal chromatic aberration, particularly at intermediate focal point distances.

In addition, it is preferable for Conditional Formula (1) below to be satisfied. By configuring the zoom lens such that Conditional Formula (1) is satisfied, the generation of spherical aberration can be suppressed throughout the entire zoom range. Note that more favorable properties can be obtained if Conditional Formula (1-1) below is satisfied.

$$0.3 < (r4af - r4ar)/(r4af + r4ar) < 0.9 \quad (1)$$

$$0.4 < (r4af - r4ar)/(r4af + r4ar) < 0.8 \quad (1\text{-}1)$$

wherein r4af is the radius of curvature of the surface toward the object side of the 4a lens, and r4ar is the radius of curvature of the surface toward the image side of the 4a lens.

In addition, it is preferable for Conditional Formula (2) below to be satisfied. By configuring the zoom lens such that Conditional Formula (2) is satisfied, the generation of spherical aberration can be suppressed throughout the entire zoom range. Note that more favorable properties can be obtained if Conditional Formula (2-1) below is satisfied.

$$-3 < (r4bf + r4br)/(r4bf - r4br) < -1.2 \quad (2)$$

$$-2.5 < (r4bf + r4br)/(r4bf - r4br) < -1.4 \quad (2\text{-}1)$$

wherein r4bf is the radius of curvature of the surface toward the object side of the 4b lens, and r4br is the radius of curvature of the surface toward the image side of the 4b lens.

In addition, it is preferable for Conditional Formula (3) below to be satisfied. By configuring the zoom lens such that the value of (r2bf+r2br)/(r2bf−r2br) is not less than or equal to the lower limit defined in Conditional Formula (3), spherical aberration at the telephoto end can be corrected, while preventing distortion from increasing at the wide angle end. By configuring the zoom lens such that the value of (r2bf+r2br)/(r2bf−r2br) is not greater than or equal to the upper limit defined in Conditional Formula (3), spherical aberration at the telephoto end being excessively corrected can be prevented. Note that more favorable properties can be obtained if Conditional Formula (3-1) below is satisfied.

$$0.2<(r2bf+r2br)/(r2bf-r2br)<0.8 \tag{3}$$

$$0.45<(r2bf+r2br)/(r2bf-r2br)<0.6 \tag{3-1}$$

wherein r2bf is the radius of curvature of the surface toward the object side of the 2b lens, and r2br is the radius of curvature of the surface toward the image side of the 2b lens.

In addition, it is preferable for Conditional Formula (4) below to be satisfied. By configuring the zoom lens such that Conditional Formula (4) is satisfied, spherical aberration at the telephoto end being excessively corrected can be prevented. Note that more favorable properties can be obtained if Conditional Formula (4-1) below is satisfied.

$$-2.5<(r2df-r2dr)/(r2df+r2dr)<-0.4 \tag{4}$$

$$-2<(r2df-r2dr)/(r2df+r2dr)<-0.6 \tag{4-1}$$

wherein r2df is the radius of curvature of the surface toward the object side of the 2d lens, and r2dr is the radius of curvature of the surface toward the image side of the 2d lens.

In addition, it is preferable for Conditional Formula (5) below to be satisfied. By configuring the zoom lens such that the value of f4/f4a is not less than or equal to the lower limit defined in Conditional Formula (5), the refractive power of the 4a lens L4a can be sufficiently secured. Therefore, marginal axial rays of light can become more parallel at the position of the aperture stop St. By configuring the zoom lens such that the value of f4/f4a is not greater than or equal to the upper limit defined in Conditional Formula (5), the refractive power of the 4a lens L4a can be prevented from becoming excessively strong. Therefore, the generation of spherical aberration can be suppressed. Note that more favorable properties can be obtained if Conditional Formula (5-1) below is satisfied.

$$0.4<f4/f4a<1 \tag{5}$$

$$0.5<f4/f4a<0.85 \tag{5-1}$$

wherein f4 is the focal length of the fourth lens group with respect to the d line, and f4a is the focal length of the 4a lens with respect to the d line.

In addition, it is preferable for Conditional Formula (6) below to be satisfied. By configuring the zoom lens such that Conditional Formula (6) is satisfied, the generation of spherical aberration can be suppressed. Note that more favorable properties can be obtained if Conditional Formula (6-1) below is satisfied.

$$1.5<f4b/f4a<3 \tag{6}$$

$$1.8<f4b/f4a<2.5 \tag{6-1}$$

wherein f4b is the focal length of the 4b lens with respect to the d line, and f4a is the focal length of the 4a lens with respect to the d line.

In the case that the 3a lens and the 3b lens are cemented together, it is preferable for Conditional Formula (7) below to be satisfied. Conditional Formula (7) represents the ability of the coupling surface of the cemented lens to correct longitudinal chromatic aberration. By configuring the zoom lens such that the value of f3/r3ar·((1−n3a)/v3a+(n3b−1)/v3b) is not less than or equal to the lower limit defined in Conditional Formula (7), longitudinal chromatic aberration at the wide angle end can be favorably corrected. By configuring the zoom lens such that the value of f3/r3ar·((1−n3a)/v3a+(n3b−1)/v3b) is not greater than or equal to the upper limit defined in Conditional Formula (7), fluctuations in longitudinal chromatic aberration caused by zooming operations can be suppressed. Note that more favorable properties can be obtained if Conditional Formula (7-1) below is satisfied.

$$-0.2<f3/r3ar\cdot((1-n3a)/v3a+(n3b-1)/v3b)<-0.04 \tag{7}$$

$$-0.15<f3/r3ar\cdot((1-n3a)/v3a+(n3b-1)/v3b)<-0.06 \tag{7-1}$$

wherein f3 is the focal length of the third lens group with respect to the d line, r3ar is the radius of curvature of the surface toward the image side of the 3a lens, n3a is the refractive index of the 3a lens with respect to the d line, v3a is the Abbe's number of the 3a lens with respect to the d line, n3b is the refractive index of the 3b lens with respect to the d line, and v3b is the Abbe's number of the 3a lens with respect to the d line.

In addition, FIG. 1 illustrates an example in which the optical member PP is provided between the lens system and the image formation plane Sim. Note that various filters such as a low pass filter and a filter that cuts off specific wavelength bands may be provided among the lenses instead of being provided between the lens system and the image formation plane Sim. As a further alternative, coatings that exhibit the same effects as these filters may be administered on the lens surfaces of the lenses.

Next, examples of numerical values of the zoom lens of the present disclosure will be described.

First, a zoom lens of Example 1 will be described. FIG. 1 is a cross sectional diagram that illustrates the lens configuration of the zoom lens of Example 1. Note that in FIG. 1 and FIGS. 2 through 7 that correspond to Examples 2 through 7 to be described later, the left side is the object side and the right side is the image side. Note that the aperture stops St illustrated in FIGS. 1 through 7 do not necessarily represent the sizes and shapes thereof, but only the positions thereof along the optical axis Z. In addition, FIG. 1 illustrates the movement trajectory of each lens group when changing magnification, and FIGS. 1 through 7 also illustrate axial light beams wa and light beams wb at a maximum angle of view.

The zoom lens of Example 1 is constituted by, in order from the object side to the image side, the first lens group G1 constituted by three lenses, which are lenses L1a through L1c, the second lens group G2 constituted by four lenses, which are lenses L2a through L2d, the third lens group G3 constituted by two lenses, which are lenses L3a and L3b, and the fourth lens group G4 constituted by eight lenses, which are lenses L4a through L4h.

Basic lens data are shown in Table 1, data related to various items are shown in Table 2, and data related to variable distances among surfaces are shown in Table 3 for the zoom lens of Example 1. The meanings of the symbols in the tables will be described for Example 1 as an example, but the meanings are basically the same for Examples 2 through 7 as well.

In Table 1, surface numbers that sequentially increase with the surface of the constituent element most toward the object side being designated as 1 are listed in the column Surface Number; the radii of curvature of each surface are listed in the column Radius of Curvature; and distances along the optical axis Z between each surface and a surface adjacent thereto are listed in the column Distance. In addition, the refractive indices with respect to the d line (wavelength: 587.6 nm) of each constituent element are listed in the column n; and the Abbe's numbers with respect to the d line (wavelength: 587.6 nm) of each constituent element are listed in the column ν.

Here, the signs of the radii of curvature are positive in cases that the surface shape is convex toward the object side, and negative in cases that the surface shape is convex toward the image side. Table 1 also shows data regarding the aperture stop St and the optical member PP. Text reading "(Stop)" is indicated along with a surface number in the column of the surface number at the surface corresponding to the aperture stop. In addition, in Table 1, "DD [surface number]" is shown in each of the rows of distances for distances that change when changing magnification. Numerical values corresponding to the "DD [surface number]" are shown in Table 3.

The values of the focal length f of the entire lens system, the back focus Bf, the F number F No., and the full angle of view 2ω are shown as data related to various items in Table 2.

In the basic lens data, the data related to various items, and data related to variable distances among surfaces, degrees are used as the units for angles and mm are used as the units for lengths. However, it is possible for optical systems to be proportionately enlarged or proportionately reduced and utilized. Therefore, other appropriate units may be used.

TABLE 1

Example 1: Lens Data

| Surface Number | Radius of Curvature | Distance | nd | νd |
|---|---|---|---|---|
| 1 | 63.17728 | 1.6000 | 2.001 | 25.46 |
| 2 | 43.74105 | 8.6184 | 1.595 | 67.73 |
| 3 | −380.43237 | 0.0100 | | |
| 4 | 41.66604 | 5.5268 | 1.497 | 81.61 |
| 5 | 129.28677 | DD [5] | | |
| 6 | ∞ | 0.8000 | 2.001 | 29.13 |
| 7 | 16.66656 | 4.0189 | | |
| 8 | −60.07397 | 0.8100 | 1.613 | 44.27 |
| 9 | 19.02784 | 4.0734 | 2.104 | 17.02 |
| 10 | −1214.12691 | 0.7448 | | |
| 11 | −59.28674 | 0.7501 | 2.104 | 17.02 |
| 12 | ∞ | DD [12] | | |
| 13 | −24.45872 | 0.7598 | 1.541 | 47.20 |
| 14 | 40.35434 | 1.5424 | 2.003 | 19.32 |
| 15 | 80.47481 | DD [15] | | |
| 16 | −87.59959 | 3.1967 | 1.900 | 37.37 |
| 17 | −22.43756 | 1.0000 | | |
| 18 (stop) | ∞ | 2.5000 | | |
| 19 | 25.00000 | 2.9763 | 1.497 | 81.61 |
| 20 | 76.74735 | 0.1000 | | |
| 21 | 17.88882 | 4.7012 | 1.538 | 74.70 |
| 22 | −70.87643 | 0.9721 | | |
| 23 | −26.38315 | 1.0000 | 1.923 | 18.90 |
| 24 | 101.05427 | 7.5002 | | |
| 25 | −107.92915 | 3.4880 | 2.003 | 19.32 |
| 26 | −23.25913 | 0.1000 | | |
| 27 | ∞ | 1.0000 | 1.752 | 25.05 |
| 28 | 13.88881 | 2.1426 | | |
| 29 | 42.20506 | 2.5002 | 1.697 | 55.53 |
| 30 | −42.20571 | 0.1000 | | |
| 31 | 18.30972 | 3.0829 | 1.497 | 81.61 |
| 32 | ∞ | 0.0000 | | |
| 33 | ∞ | 4.0000 | 1.516 | 64.05 |
| 34 | ∞ | | | |

TABLE 2

Example 1: Items (d line)

| | Wide Angle | Intermediate | Telephoto |
|---|---|---|---|
| Zoom Ratio | 1.0 | 4.0 | 7.7 |
| f | 8.186 | 32.743 | 63.030 |
| Bf | 12.689 | 12.689 | 12.689 |
| F No. | 1.26 | 1.26 | 1.35 |
| 2ω (°) | 55.8 | 13.8 | 7.2 |

TABLE 3

Example 1: Zoom Distances

| | Wide Angle | Intermediate | Telephoto |
|---|---|---|---|
| DD [5] | 0.897 | 27.329 | 33.989 |
| DD [12] | 32.557 | 3.796 | 3.254 |
| DD [15] | 5.539 | 7.868 | 1.750 |

FIG. 8 is a collection of diagrams that illustrate aberrations of the zoom lens of Example 1. In the upper portion of FIG. 8, diagrams that illustrate spherical aberration, astigmatism, and lateral chromatic aberration of the zoom lens of Example 1 at the wide angle end are illustrated in this order from the left side of the drawing sheet. In the middle portion of FIG. 8, diagrams that illustrate spherical aberration, astigmatism, and lateral chromatic aberration of the zoom lens of Example 1 at an intermediate position are illustrated in this order from the left side of the drawing sheet. In the lower portion of FIG. 8, diagrams that illustrate spherical aberration, astigmatism, and lateral chromatic aberration of the zoom lens of Example 1 at the telephoto end are illustrated in this order from the left side of the drawing sheet. The diagrams that illustrate spherical aberration and astigmatism show aberrations with the d line (wavelength: 587.6 nm) as a reference wavelength. The diagrams that illustrate spherical aberration shows aberrations related to the d line (wavelength: 587.6 nm), the C line (wavelength: 656.3 nm), the F line (wavelength: 486.1 nm), and the g line (wavelength: 435.8 nm) are indicated by solid lines, long broken lines, short broken lines, and solid gray lines, respectively. In the diagrams that illustrate astigmatism, aberrations in the sagittal direction and aberrations in the tangential direction related to the d line are indicated by solid lines and short broken lines, respectively. In the diagrams that illustrate lateral chromatic aberration, aberrations related to the C line (wavelength: 656.3 nm), the F line (wavelength: 486.1 nm), and the g line (wavelength: 435.8 nm) are indicated by long broken lines, short broken lines, and solid gray lines, respectively. In the diagram that illustrates spherical aberration, "FNo." denotes the F number. In the other diagrams that illustrate the aberrations, ω denotes half angles of view.

Figure 2:
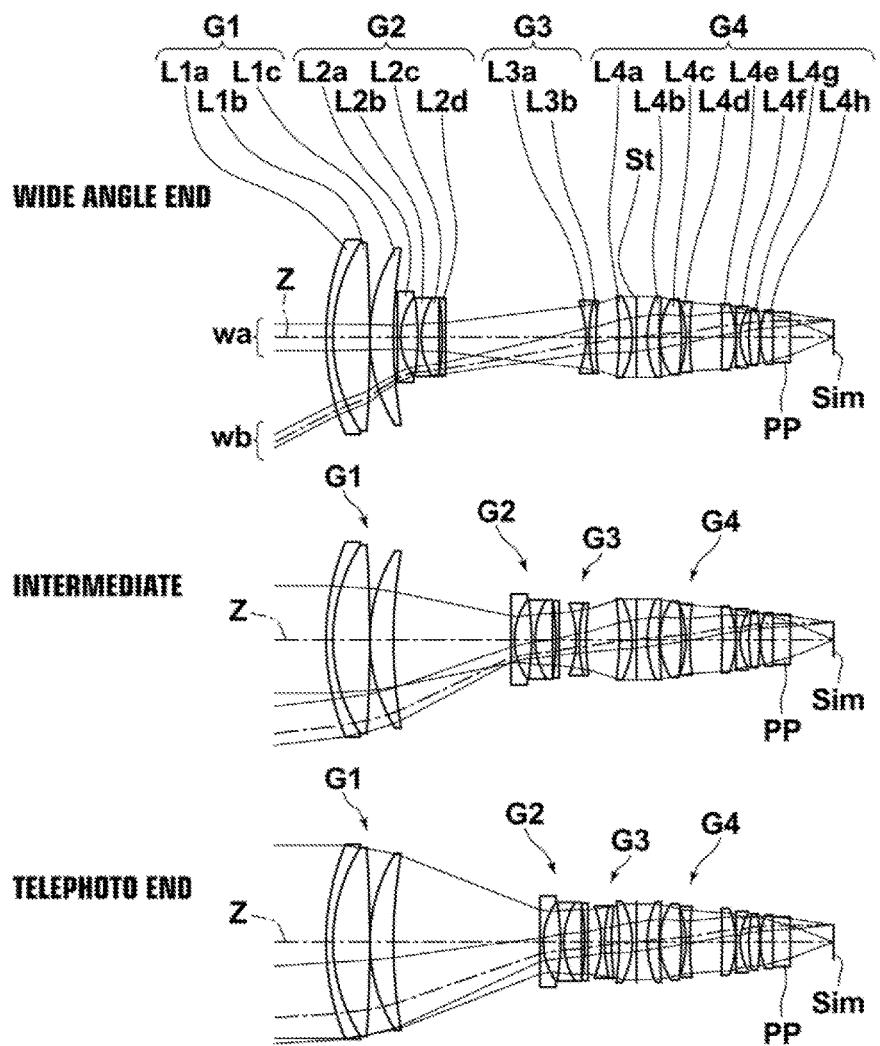
FIG. 2 is a collection of cross sectional diagrams that illustrate the lens configuration of a zoom lens according to Example 2 of the present disclosure.

Next, a zoom lens of Example 2 will be described. FIG. 2 is collection of cross sectional diagrams that illustrate the lens configuration of the zoom lens of Example 2. The zoom lens of Example 2 has the same number of lenses and the same lens configuration as the zoom lens of Example 1. Basic lens data are shown in Table 4, data related to various items are shown in Table 5, and data related to variable distances among surfaces are shown in Table 6 for the zoom lens of Example 2. In addition, FIG. 9 is a collection of diagrams that illustrate various aberrations of the zoom lens of Example 2.

TABLE 4

Example 2: Lens Data

| Surface Number | Radius of Curvature | Distance | nd | vd |
|---|---|---|---|---|
| 1 | 63.42210 | 1.6000 | 2.001 | 25.46 |
| 2 | 43.88040 | 8.5716 | 1.595 | 67.73 |
| 3 | −368.22272 | 0.0100 | | |
| 4 | 41.66604 | 5.4915 | 1.497 | 81.61 |
| 5 | 127.26898 | DD [5] | | |
| 6 | ∞ | 0.8000 | 2.001 | 29.13 |
| 7 | 16.66657 | 3.9715 | | |
| 8 | −63.79459 | 0.8100 | 1.613 | 44.27 |
| 9 | 18.79434 | 4.0947 | 2.104 | 17.02 |
| 10 | −8212.28940 | 0.7811 | | |
| 11 | −59.19801 | 0.7501 | 2.104 | 17.02 |
| 12 | ∞ | DD [12] | | |
| 13 | −24.03893 | 0.7598 | 1.541 | 47.20 |
| 14 | 39.44163 | 1.6081 | 2.003 | 19.32 |
| 15 | 77.62920 | DD [15] | | |
| 16 | −73.78138 | 3.0345 | 1.900 | 37.37 |
| 17 | −21.85199 | 1.0000 | | |
| 18 (stop) | ∞ | 2.5000 | | |
| 19 | 25.00013 | 2.8262 | 1.497 | 81.61 |
| 20 | 100.87587 | 0.1000 | | |
| 21 | 17.77167 | 5.0002 | 1.538 | 74.70 |
| 22 | −80.59193 | 1.0156 | | |
| 23 | −26.70579 | 1.0000 | 1.923 | 18.90 |
| 24 | 83.67249 | 7.5002 | | |
| 25 | −137.73186 | 3.0774 | 2.003 | 19.32 |
| 26 | −23.47140 | 0.1000 | | |
| 27 | ∞ | 1.0000 | 1.752 | 25.05 |
| 28 | 13.88882 | 2.0439 | | |
| 29 | 42.90561 | 2.5002 | 1.697 | 55.53 |
| 30 | −42.90628 | 0.1000 | | |
| 31 | 18.25938 | 3.1505 | 1.497 | 81.61 |
| 32 | ∞ | 0.0000 | | |
| 33 | ∞ | 4.0000 | 1.516 | 64.05 |
| 34 | ∞ | | | |

TABLE 5

Example 2: Items (d line)

| | Wide Angle | Intermediate | Telephoto |
|---|---|---|---|
| Zoom Ratio | 1.0 | 4.0 | 7.7 |
| f | 8.179 | 32.714 | 62.975 |
| Bf | 12.716 | 12.716 | 12.716 |
| F No. | 1.26 | 1.26 | 1.35 |
| 2ω (°) | 55.8 | 13.8 | 7.2 |

TABLE 6

Example 2: Zoom Distances

| | Wide Angle | Intermediate | Telephoto |
|---|---|---|---|
| DD [5] | 0.893 | 27.391 | 34.089 |
| DD [12] | 32.711 | 3.938 | 3.131 |
| DD [15] | 5.367 | 7.642 | 1.751 |

TABLE 7

Example 3: Lens Data

| Surface Number | Radius of Curvature | Distance | nd | vd |
|---|---|---|---|---|
| 1 | 63.66603 | 1.6000 | 2.001 | 25.46 |
| 2 | 44.02708 | 8.5455 | 1.595 | 67.73 |
| 3 | −366.67820 | 0.0100 | | |
| 4 | 41.66604 | 5.5001 | 1.497 | 81.61 |
| 5 | 128.13582 | DD [5] | | |
| 6 | ∞ | 0.8000 | 2.001 | 29.13 |
| 7 | 16.70874 | 4.0043 | | |
| 8 | −60.43157 | 0.8100 | 1.613 | 44.27 |
| 9 | 18.98652 | 4.1364 | 2.104 | 17.02 |
| 10 | −601.85497 | 0.7505 | | |
| 11 | −56.29797 | 0.7501 | 2.104 | 17.02 |
| 12 | ∞ | DD [12] | | |
| 13 | −24.42216 | 0.7598 | 1.541 | 47.20 |
| 14 | 41.35198 | 1.5777 | 2.003 | 19.32 |
| 15 | 81.97129 | DD [15] | | |
| 16 | −81.03389 | 3.0109 | 1.900 | 37.37 |
| 17 | −22.38757 | 1.0000 | | |
| 18 (stop) | ∞ | 2.5000 | | |
| 19 | 25.00013 | 2.8689 | 1.497 | 81.61 |
| 20 | 110.96650 | 0.1000 | | |
| 21 | 18.38614 | 5.0002 | 1.538 | 74.70 |
| 22 | −75.37886 | 0.9622 | | |
| 23 | −26.86358 | 1.0000 | 1.923 | 18.90 |
| 24 | 86.79343 | 7.5002 | | |
| 25 | −141.35753 | 3.0323 | 2.003 | 19.32 |
| 26 | −23.67975 | 0.1000 | | |
| 27 | ∞ | 1.0000 | 1.752 | 25.05 |
| 28 | 13.88882 | 2.3808 | | |
| 29 | 43.61778 | 2.5001 | 1.697 | 55.53 |
| 30 | −43.61847 | 0.1000 | | |
| 31 | 17.91587 | 2.8817 | 1.497 | 81.61 |
| 32 | ∞ | 0.0000 | | |
| 33 | ∞ | 4.0000 | 1.516 | 64.05 |
| 34 | ∞ | | | |

TABLE 8

Example 3: Items (d line)

| | Wide Angle | Intermediate | Telephoto |
|---|---|---|---|
| Zoom Ratio | 1.0 | 4.0 | 7.7 |
| f | 8.182 | 32.728 | 63.001 |
| Bf | 12.690 | 12.690 | 12.690 |
| F No. | 1.26 | 1.26 | 1.35 |
| 2ω (°) | 56.0 | 13.8 | 7.2 |

TABLE 9

Example 3: Zoom Distances

| | Wide Angle | Intermediate | Telephoto |
|---|---|---|---|
| DD [5] | 0.885 | 27.399 | 34.086 |
| DD [12] | 32.664 | 3.829 | 3.227 |
| DD [15] | 5.510 | 7.831 | 1.746 |

Figure 3:
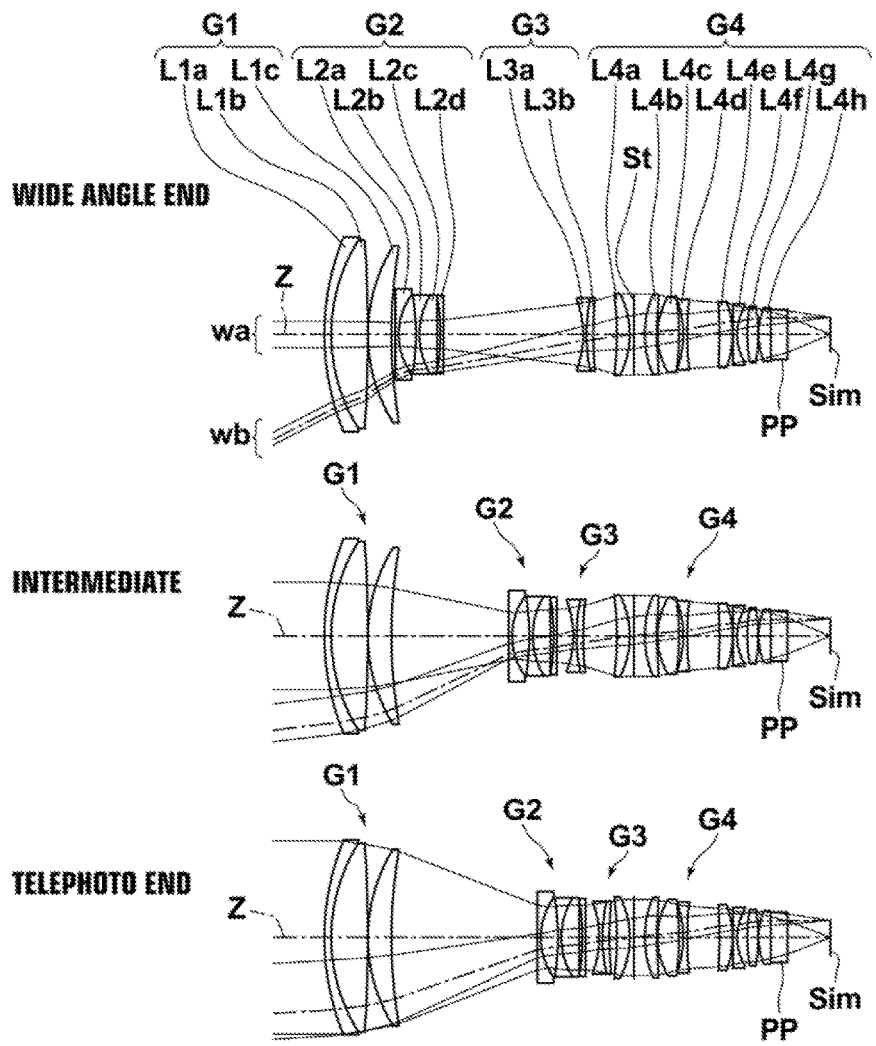
FIG. 3 is a collection of cross sectional diagrams that illustrate the lens configuration of a zoom lens according to Example 3 of the present disclosure.

Next, a zoom lens of Example 3 will be described. FIG. 3 is a collection of cross sectional diagrams that illustrate the lens configuration of the zoom lens of Example 3. The zoom lens of Example 3 has the same number of lenses and the same lens configuration as the zoom lens of Example 1. Basic lens data are shown in Table 7, data related to various items are shown in Table 8, and data related to variable distances among surfaces are shown in Table 9 for the zoom lens of Example 3. In addition, FIG. 10 is a collection of diagrams that illustrate various aberrations of the zoom lens of Example 3.

Figure 4:
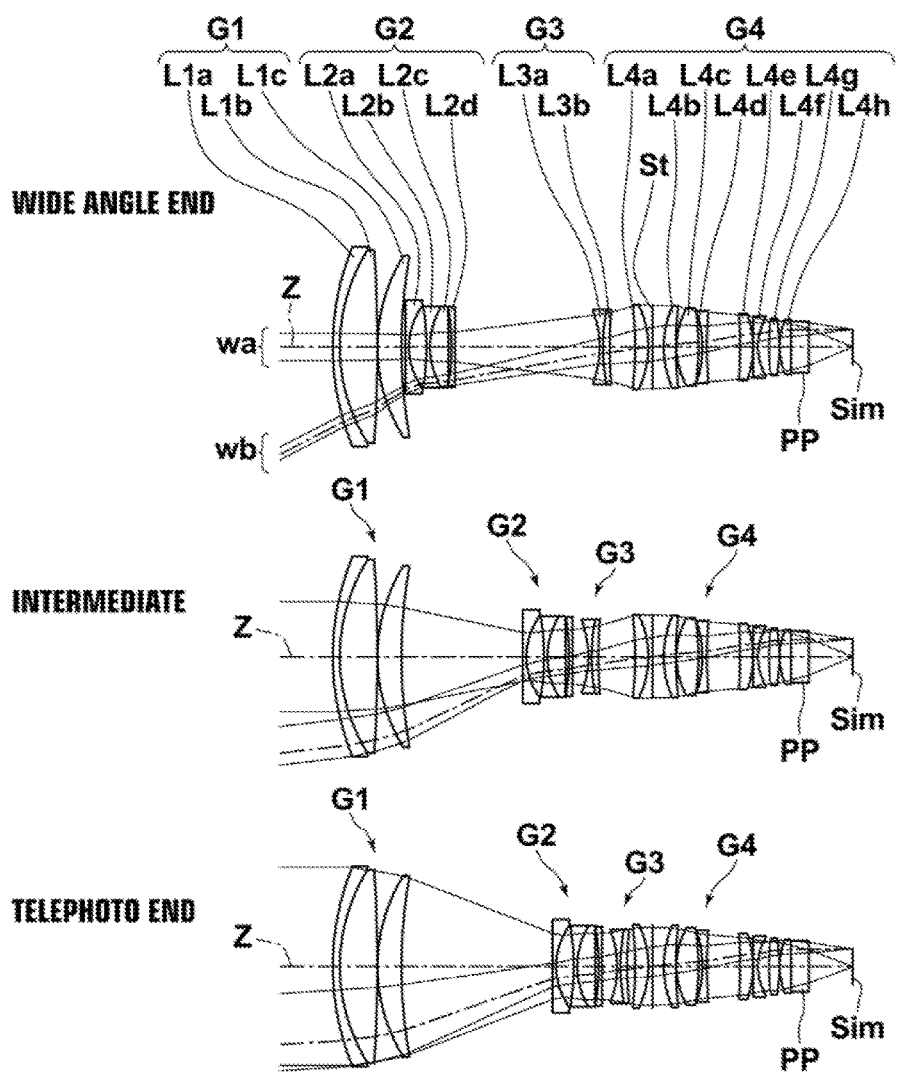
FIG. 4 is a collection of cross sectional diagrams that illustrate the lens configuration of a zoom lens according to Example 4 of the present disclosure.

Next, a zoom lens of Example 4 will be described. FIG. 4 is a collection of cross sectional diagrams that illustrate the lens configuration of the zoom lens of Example 4. The zoom lens of Example 4 has the same number of lenses and the same lens configuration as the zoom lens of Example 1. Basic lens data are shown in Table 10, data related to various items are shown in Table 11, and data related to variable distances among surfaces are shown in Table 12 for the zoom lens of Example 4. In addition, FIG. 11 is a collection of diagrams that illustrate various aberrations of the zoom lens of Example 4.

TABLE 10

Example 4: Lens Data

| Surface Number | Radius of Curvature | Distance | nd | vd |
|---|---|---|---|---|
| 1 | 64.04470 | 1.6000 | 2.001 | 25.46 |
| 2 | 44.29933 | 8.5032 | 1.595 | 67.73 |
| 3 | −363.08409 | 0.0100 | | |
| 4 | 41.66604 | 5.4632 | 1.497 | 81.61 |
| 5 | 126.07701 | DD [5] | | |
| 6 | ∞ | 0.8000 | 2.001 | 29.13 |
| 7 | 16.76532 | 3.9754 | | |
| 8 | −62.07528 | 0.8100 | 1.613 | 44.27 |
| 9 | 19.01145 | 4.1153 | 2.104 | 17.02 |
| 10 | −722.88695 | 0.7580 | | |
| 11 | −56.58417 | 0.7501 | 2.104 | 17.02 |
| 12 | ∞ | DD [12] | | |
| 13 | −24.90855 | 0.7598 | 1.541 | 47.20 |
| 14 | 48.20901 | 1.5227 | 2.003 | 19.32 |
| 15 | 102.90267 | DD [15] | | |
| 16 | −107.26944 | 3.0242 | 1.900 | 37.37 |
| 17 | −23.53818 | 1.0000 | | |
| 18 (stop) | ∞ | 2.5000 | | |
| 19 | 24.99978 | 2.7611 | 1.497 | 81.61 |
| 20 | 94.51535 | 0.1000 | | |
| 21 | 19.15389 | 5.0002 | 1.538 | 74.70 |
| 22 | −65.42120 | 0.9017 | | |
| 23 | −26.26519 | 1.0000 | 1.923 | 18.90 |
| 24 | 102.76606 | 7.5002 | | |
| 25 | −119.52074 | 2.9597 | 2.003 | 19.32 |
| 26 | −23.43544 | 0.1000 | | |
| 27 | ∞ | 1.0000 | 1.752 | 25.05 |
| 28 | 13.88888 | 2.5002 | | |
| 29 | 43.76694 | 2.4998 | 1.697 | 55.53 |
| 30 | −43.76764 | 0.1000 | | |
| 31 | 17.65765 | 2.5740 | 1.497 | 81.61 |
| 32 | ∞ | 0.0000 | | |
| 33 | ∞ | 4.0000 | 1.516 | 64.05 |
| 34 | ∞ | | | |

TABLE 11

Example 4: Items (d line)

| | Wide Angle | Intermediate | Telephoto |
|---|---|---|---|
| Zoom Ratio | 1.0 | 4.0 | 7.7 |
| f | 8.192 | 32.768 | 63.077 |
| Bf | 12.613 | 12.613 | 12.613 |
| F No. | 1.26 | 1.26 | 1.35 |
| 2ω (°) | 56.0 | 13.8 | 7.2 |

TABLE 12

Example 4: Zoom Distances

| | Wide Angle | Intermediate | Telephoto |
|---|---|---|---|
| DD [5] | 0.876 | 27.565 | 34.277 |
| DD [12] | 32.881 | 3.611 | 3.457 |
| DD [15] | 5.715 | 8.296 | 1.738 |

TABLE 13

Example 5: Lens Data

| Surface Number | Radius of Curvature | Distance | nd | vd |
|---|---|---|---|---|
| 1 | 64.48071 | 1.6000 | 2.001 | 25.46 |
| 2 | 44.43341 | 8.4768 | 1.595 | 67.73 |
| 3 | −367.32079 | 0.0100 | | |
| 4 | 41.66625 | 5.5141 | 1.497 | 81.61 |
| 5 | 129.40447 | DD [5] | | |
| 6 | ∞ | 0.8000 | 2.001 | 29.13 |
| 7 | 16.69774 | 3.9867 | | |
| 8 | −70.05994 | 0.8100 | 1.613 | 44.27 |
| 9 | 18.36168 | 4.3458 | 2.104 | 17.02 |
| 10 | −320.36402 | 0.6421 | | |
| 11 | −60.91440 | 0.7501 | 2.104 | 17.02 |
| 12 | 210.36913 | DD [12] | | |
| 13 | −24.57051 | 0.7598 | 1.541 | 47.20 |
| 14 | 55.46947 | 1.4720 | 2.003 | 19.32 |
| 15 | 125.32931 | DD [15] | | |
| 16 | −104.24310 | 3.0346 | 1.900 | 37.37 |
| 17 | −23.40188 | 1.0000 | | |
| 18 (stop) | ∞ | 2.5000 | | |
| 19 | 24.99978 | 2.7132 | 1.497 | 81.61 |
| 20 | 86.90996 | 0.1000 | | |
| 21 | 19.21931 | 5.0002 | 1.538 | 74.70 |
| 22 | −64.98833 | 0.9639 | | |
| 23 | −25.83592 | 1.0000 | 1.923 | 18.90 |
| 24 | 120.45343 | 7.5001 | | |
| 25 | −107.59119 | 2.9425 | 2.003 | 19.32 |
| 26 | −23.20531 | 0.1000 | | |
| 27 | ∞ | 1.0000 | 1.752 | 25.05 |
| 28 | 13.88882 | 2.5001 | | |
| 29 | 43.17006 | 2.4998 | 1.697 | 55.53 |
| 30 | −43.17006 | 0.1000 | | |
| 31 | 17.79155 | 2.5307 | 1.497 | 81.61 |
| 32 | ∞ | 0.0000 | | |
| 33 | ∞ | 4.0000 | 1.516 | 64.05 |
| 34 | ∞ | | | |

TABLE 14

Example 5: Items (d line)

| | Wide Angle | Intermediate | Telephoto |
|---|---|---|---|
| Zoom Ratio | 1.0 | 4.0 | 7.7 |
| f | 8.206 | 32.825 | 63.188 |
| Bf | 12.641 | 12.641 | 12.641 |
| F No. | 1.26 | 1.26 | 1.35 |
| 2ω (°) | 55.8 | 13.8 | 7.2 |

TABLE 15

Example 5: Zoom Distances

| | Wide Angle | Intermediate | Telephoto |
|---|---|---|---|
| DD [5] | 0.867 | 27.522 | 34.236 |
| DD [12] | 32.956 | 3.593 | 3.485 |
| DD [15] | 5.636 | 8.344 | 1.738 |

Figure 5:
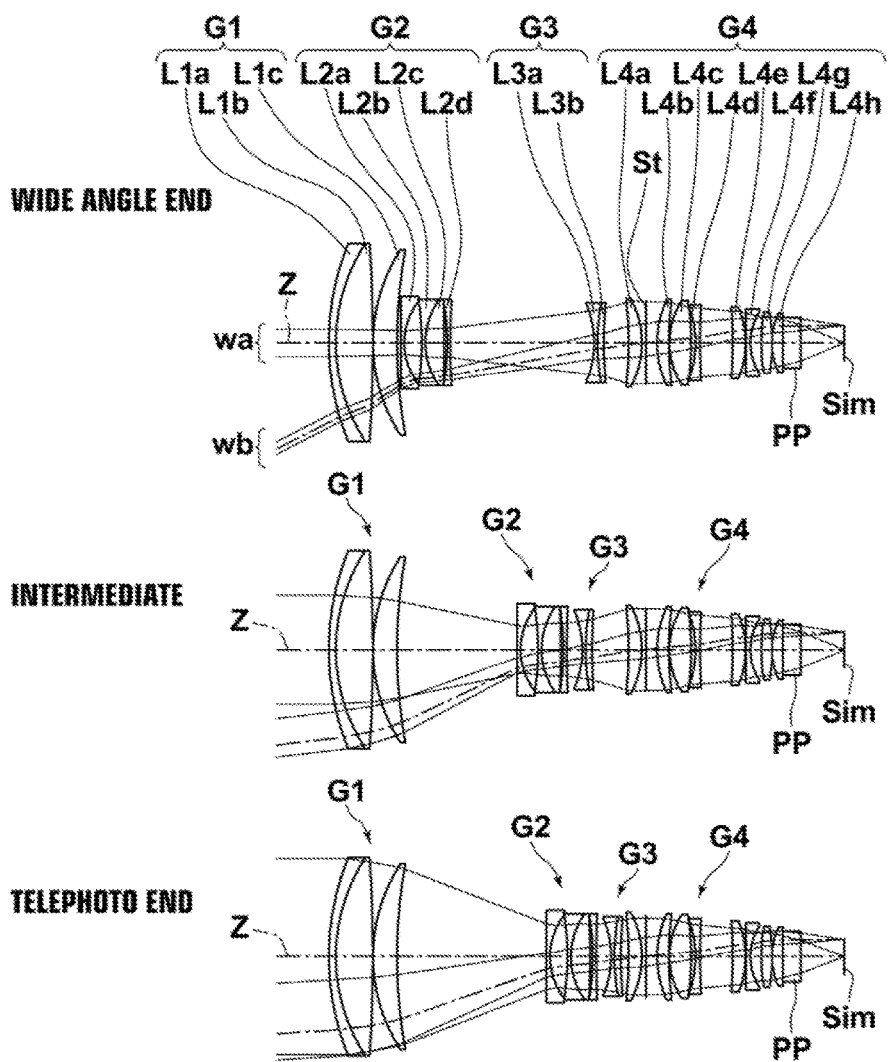
FIG. 5 is a collection of cross sectional diagrams that illustrate the lens configuration of a zoom lens according to Example 5 of the present disclosure.

Next, a zoom lens of Example 5 will be described. FIG. 5 is a collection of cross sectional diagrams that illustrate the lens configuration of the zoom lens of Example 5. The zoom lens of Example 5 has the same number of lenses and the same lens configuration as the zoom lens of Example 1. Basic lens data are shown in Table 13, data related to various items are shown in Table 14, and data related to variable distances among surfaces are shown in Table 15 for the zoom lens of Example 5. In addition, FIG. 12 is a collection of diagrams that illustrate various aberrations of the zoom lens of Example 5.

Figure 6:
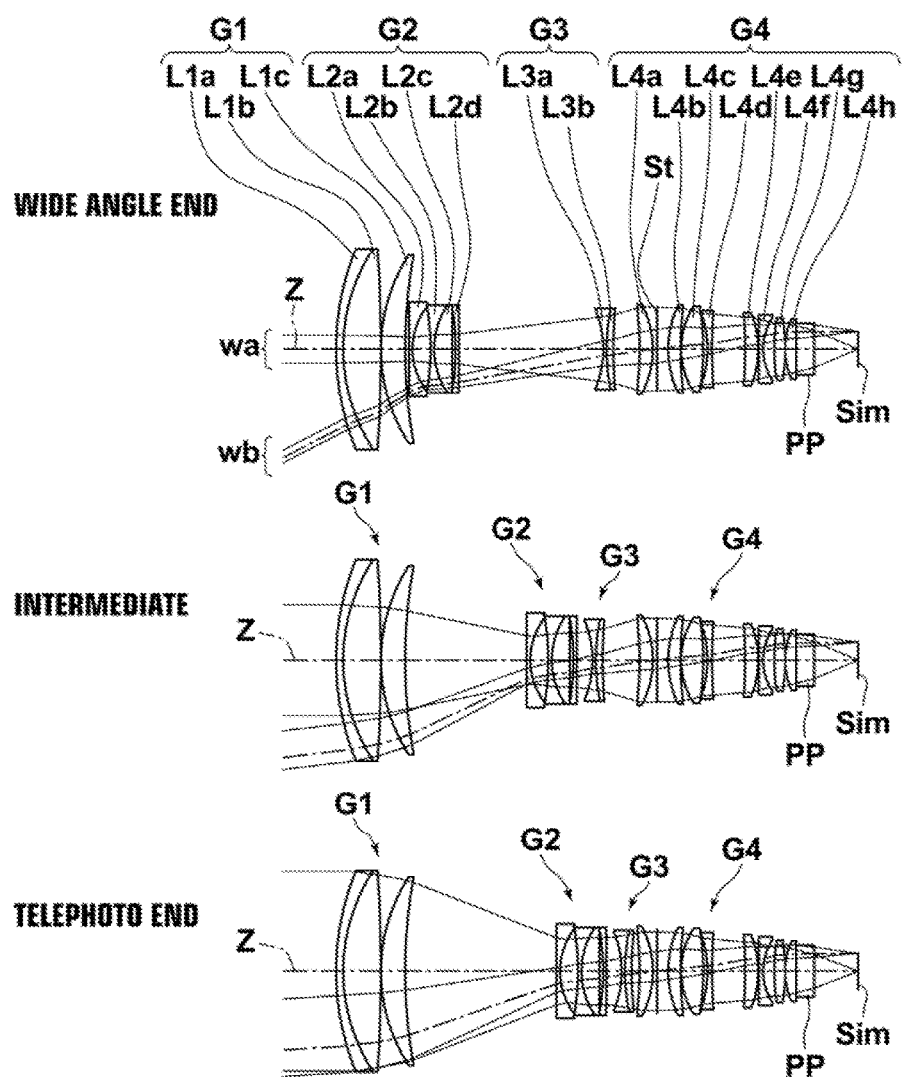
FIG. 6 is a collection of cross sectional diagrams that illustrate the lens configuration of a zoom lens according to Example 6 of the present disclosure.

Next, a zoom lens of Example 6 will be described. FIG. 6 is a collection of cross sectional diagrams that illustrate the lens configuration of the zoom lens of Example 6. The zoom lens of Example 6 has the same number of lenses and the same lens configuration as the zoom lens of Example 1. Basic lens data are shown in Table 16, data related to various items are shown in Table 17, and data related to variable distances among surfaces are shown in Table 18 for the zoom lens of Example 6. In addition, FIG. 13 is a collection of diagrams that illustrate various aberrations of the zoom lens of Example 6.

TABLE 16

Example 6: Lens Data

| Surface Number | Radius of Curvature | Distance | nd | vd |
|---|---|---|---|---|
| 1 | 63.78578 | 1.6000 | 2.001 | 25.46 |
| 2 | 44.16568 | 8.5055 | 1.595 | 67.73 |
| 3 | −374.90329 | 0.0100 | | |
| 4 | 41.66598 | 5.4766 | 1.497 | 81.61 |
| 5 | 127.40187 | DD [5] | | |
| 6 | ∞ | 0.8000 | 2.001 | 29.13 |
| 7 | 16.76586 | 4.0537 | | |
| 8 | −62.75571 | 0.8100 | 1.613 | 44.27 |
| 9 | 19.07213 | 4.0690 | 2.104 | 17.02 |
| 10 | −1633.98156 | 0.7997 | | |
| 11 | −58.44333 | 0.7501 | 2.104 | 17.02 |
| 12 | −2500.01660 | DD [12] | | |
| 13 | −24.82363 | 0.7598 | 1.541 | 47.20 |
| 14 | 49.06199 | 1.5009 | 2.003 | 19.32 |
| 15 | 103.63139 | DD [15] | | |
| 16 | −103.24697 | 3.0136 | 1.900 | 37.37 |
| 17 | −23.39051 | 1.0000 | | |
| 18 (stop) | ∞ | 2.5000 | | |
| 19 | 25.00011 | 2.7961 | 1.497 | 81.61 |
| 20 | 92.66328 | 0.1000 | | |
| 21 | 19.11537 | 5.0002 | 1.538 | 74.70 |
| 22 | −65.61967 | 0.9538 | | |
| 23 | −26.00553 | 1.0000 | 1.923 | 18.90 |
| 24 | 105.48496 | 7.5000 | | |
| 25 | −112.30593 | 2.9560 | 2.003 | 19.32 |
| 26 | −23.19193 | 0.1000 | | |
| 27 | ∞ | 1.0000 | 1.752 | 25.05 |
| 28 | 13.88894 | 2.5000 | | |
| 29 | 43.21276 | 2.4998 | 1.697 | 55.53 |
| 30 | −43.21276 | 0.1000 | | |
| 31 | 17.79289 | 2.5313 | 1.497 | 81.61 |
| 32 | ∞ | 0.0000 | | |
| 33 | ∞ | 4.0000 | 1.516 | 64.05 |
| 34 | ∞ | | | |

TABLE 17

Example 6: Items (d line)

| | Wide Angle | Intermediate | Telephoto |
|---|---|---|---|
| Zoom Ratio | 1.0 | 4.0 | 7.7 |
| f' | 8.204 | 32.815 | 63.168 |
| Bf | 12.622 | 12.622 | 12.622 |
| F No. | 1.26 | 1.26 | 1.35 |
| 2ω (°) | 55.8 | 13.8 | 7.2 |

TABLE 18

Example 6: Zoom Distances

| | Wide Angle | Intermediate | Telephoto |
|---|---|---|---|
| DD [5] | 0.864 | 27.511 | 34.201 |
| DD [12] | 32.642 | 3.565 | 3.471 |
| DD [15] | 5.900 | 8.330 | 1.734 |

Figure 7:
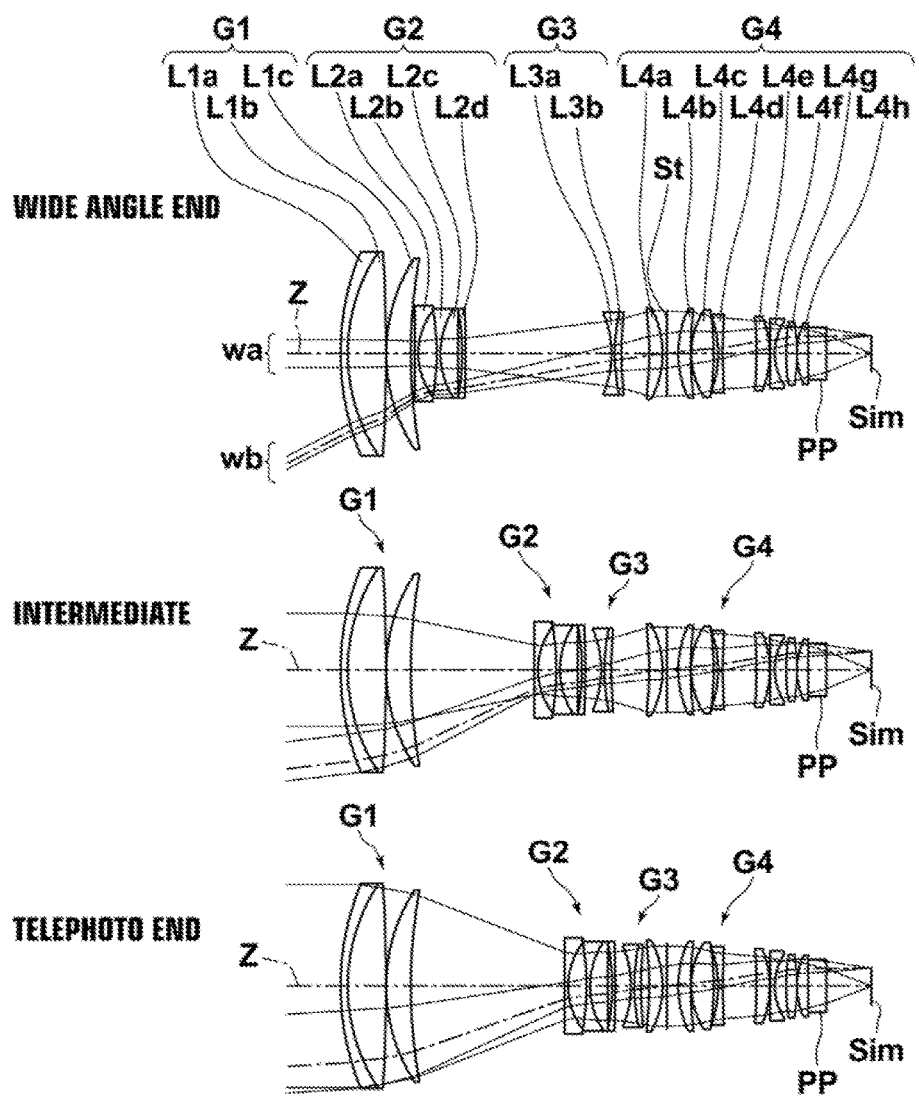
FIG. 7 is a collection of cross sectional diagrams that illustrate the lens configuration of a zoom lens according to Example 7 of the present disclosure.

Next, a zoom lens of Example 7 will be described. FIG. 7 is a collection of cross sectional diagrams that illustrate the lens configuration of the zoom lens of Example 7. The zoom lens of Example 7 has the same number of lenses and the same lens configuration as the zoom lens of Example 1. Basic lens data are shown in Table 19, data related to various items are shown in Table 20, and data related to variable distances among surfaces are shown in Table 21 for the zoom lens of Example 7. In addition, FIG. 14 is a collection of diagrams that illustrate various aberrations of the zoom lens of Example 7.

TABLE 19

Example 7: Lens Data

| Surface Number | Radius of Curvature | Distance | nd | vd |
|---|---|---|---|---|
| 1 | 63.32110 | 1.6000 | 2.001 | 25.46 |
| 2 | 43.98071 | 8.5108 | 1.595 | 67.73 |
| 3 | −389.31854 | 0.0100 | | |
| 4 | 41.66598 | 5.4731 | 1.497 | 81.61 |
| 5 | 127.23023 | DD [5] | | |
| 6 | ∞ | 0.8000 | 2.001 | 29.13 |
| 7 | 16.75969 | 4.0819 | | |
| 8 | −60.61502 | 0.8100 | 1.613 | 44.27 |
| 9 | 19.35559 | 3.9124 | 2.104 | 17.02 |
| 10 | 767.72616 | 0.9366 | | |
| 11 | −55.57829 | 0.7501 | 2.104 | 17.02 |
| 12 | −250.01682 | DD [12] | | |
| 13 | −24.80621 | 0.7598 | 1.541 | 47.20 |
| 14 | 49.01706 | 1.4963 | 2.003 | 19.32 |
| 15 | 103.04484 | DD [15] | | |
| 16 | −95.30152 | 3.0036 | 1.900 | 37.37 |
| 17 | −23.10180 | 1.0000 | | |
| 18 (stop) | ∞ | 2.5000 | | |
| 19 | 25.00011 | 2.7793 | 1.497 | 81.61 |
| 20 | 89.60480 | 0.1000 | | |
| 21 | 19.09114 | 5.0002 | 1.538 | 74.70 |
| 22 | −64.85477 | 0.9693 | | |
| 23 | −25.70044 | 1.0000 | 1.923 | 18.90 |
| 24 | 116.22974 | 7.5000 | | |
| 25 | −103.00875 | 2.9518 | 2.003 | 19.32 |
| 26 | −22.96866 | 0.1000 | | |
| 27 | ∞ | 1.0000 | 1.752 | 25.05 |
| 28 | 13.88894 | 2.5000 | | |
| 29 | 42.31783 | 2.4998 | 1.697 | 55.53 |
| 30 | −42.31783 | 0.1000 | | |
| 31 | 18.25064 | 2.4895 | 1.497 | 81.61 |
| 32 | ∞ | 0.0000 | | |
| 33 | ∞ | 4.0000 | 1.516 | 64.05 |
| 34 | ∞ | | | |

TABLE 20

Example 7: Items (d line)

| | Wide Angle | Intermediate | Telephoto |
|---|---|---|---|
| Zoom Ratio | 1.0 | 4.0 | 7.7 |
| f' | 8.201 | 32.803 | 63.147 |
| Bf | 12.665 | 12.665 | 12.665 |
| F No. | 1.26 | 1.26 | 1.35 |
| 2ω (°) | 56.0 | 13.8 | 7.2 |

TABLE 21

Example 7: Zoom Distances

| | Wide Angle | Intermediate | Telephoto |
|---|---|---|---|
| DD [5] | 0.862 | 27.503 | 34.175 |
| DD [12] | 32.467 | 3.521 | 3.490 |
| DD [15] | 6.068 | 8.373 | 1.732 |

Table 22 shows values corresponding to Conditional Formulae (1) through (7) for the zoom lenses of Examples 1 through 7. Note that all of the Examples use the d line as a reference wavelength, and the values shown in Table 22 below are those for the reference wavelength.

TABLE 22

| Formula | Condition | Example 1 | Example 2 | Example 3 | Example 4 | Example 5 | Example 6 | Example 7 |
|---|---|---|---|---|---|---|---|---|
| (1) | (r4af − r4ar)/(r4af + r4ar) | 0.592 | 0.543 | 0.567 | 0.640 | 0.633 | 0.631 | 0.610 |
| (2) | (r4bf + r4br)/(r4bf − r4br) | −1.966 | −1.659 | −1.582 | −1.719 | −1.808 | −1.739 | −1.774 |
| (3) | (r2bf + r2br)/(r2bf − r2br) | 0.519 | 0.545 | 0.522 | 0.531 | 0.585 | 0.534 | 0.516 |
| (4) | (r2df − r2dr)/(r2df + r2dr) | −1.000 | −1.000 | −1.000 | −1.000 | −1.815 | −0.954 | −0.636 |
| (5) | f4/f4a | 0.750 | 0.721 | 0.737 | 0.756 | 0.757 | 0.758 | 0.752 |
| (6) | f4b/f4a | 2.235 | 1.968 | 1.914 | 2.049 | 2.113 | 2.059 | 2.070 |
| (7) | f3/r3ar · ((1 − n3a)/v3a + (n3b − 1)/v3b) | −0.098 | −0.098 | −0.096 | −0.087 | −0.076 | −0.085 | −0.085 |

As can be understood from the above data, all of the zoom lenses of Examples 1 through 7 satisfy Conditional Formulae (1) through (7), and are zoom lenses having small F numbers throughout the entire zoom range, with F numbers of less than 1.4 at the telephoto end, at which the F number becomes maximal.

Figure 15:
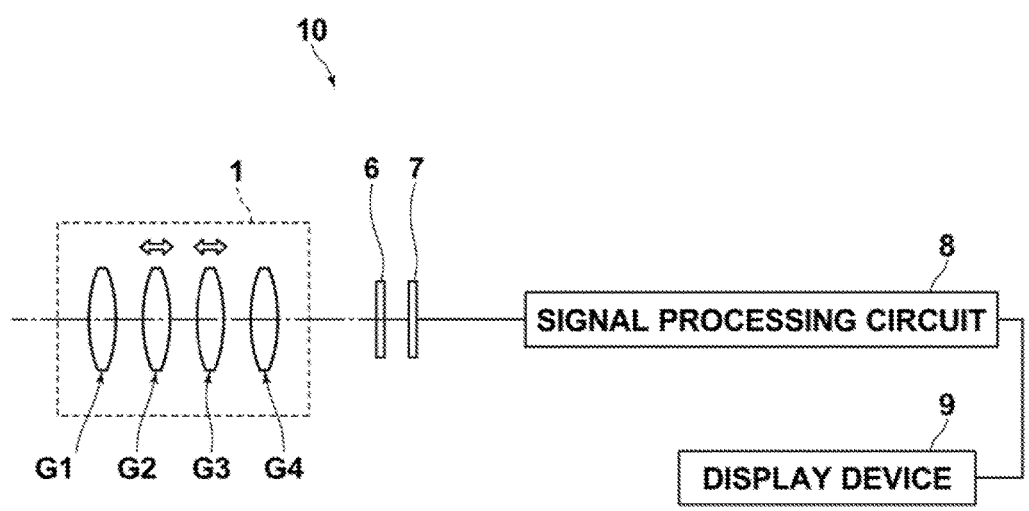
FIG. 15 is a diagram that schematically illustrates an imaging apparatus according to an embodiment of the present disclosure.

Next, an imaging apparatus according to an embodiment of the present disclosure will be described. FIG. 15 is a diagram that illustrates the schematic structure an imaging apparatus that employs a zoom lens according to an embodiment of the present disclosure as an example of an imaging apparatus of the present disclosure. Note that each of the lens groups is schematically illustrated in FIG. 15. The imaging apparatus may be a video camera, a digital still camera, or the like which is equipped with a solid state imaging element such as a CCD (Charge Coupled Device) and a CMOS (Complementary Metal Oxide Semiconductor), for example.

The imaging apparatus 10 illustrated in FIG. 15 is equipped with a zoom lens 1, a filter 6 that functions as a low pass filter or the like, provided at the image side of the zoom lens 1, an imaging element 7 provided at the image side of the filter 6, and a signal processing circuit. The imaging element 7 converts optical images formed by the zoom lens 1 into electrical signals. A CCD, a CMOS, or the like may be employed as the imaging element 7. The imaging element 7 is provided such that the image capturing surface thereof matches the image formation plane of the zoom lens 1. Images obtained through the zoom lens 1 are formed on the image capturing surface of the imaging element 7. Output signals related to these images are processed by the signal processing circuit 8, and the images are displayed by a display device 9.

The imaging apparatus 10 of the present embodiment is equipped with the zoom lens 1 of the present disclosure. Therefore, the imaging apparatus 10 is capable of obtaining bright images throughout the entire zoom range.

The present disclosure has been described with reference to the embodiments and Examples. However, the present disclosure is not limited to the above embodiments and Examples, and various modifications are possible. For example, the numerical values of the radii of curvature, the distances among surfaces, the refractive indices, the Abbe's numbers, etc. of the lens components are not limited to those exemplified in the above Examples, and may be different values.

What is claimed is:

1. A zoom lens consisting of, in order from the object side to the image side:
   a first lens group having a positive refractive power;
   a second lens group having a negative refractive power;
   a third lens group having a negative refractive power; and
   a fourth lens group having a positive refractive power;
   the first lens group and the fourth lens group being fixed when changing magnification;
   the second lens group moving from the object side to the image side when changing magnification from the wide angle end to the telephoto end;
   the third lens group moving to correct fluctuations in an image formation position caused by the movement of the second lens group;
   the first lens group consisting of, in order from the object side to the image side, a 1a lens of a negative meniscus shape with a concave surface toward the image side, a 1b lens having a positive refractive power, and a 1c lens having a positive refractive power and in which the surface thereof toward the object side has a radius of curvature with a smaller absolute value than the surface thereof toward the image side;
   the second lens group consisting of, in order from the object side to the image side, a 2a lens having a negative refractive power and in which the surface thereof toward the image side has a radius of curvature with a smaller absolute value than the surface thereof toward the object side, a 2b lens of a biconcave shape, a 2c lens having a positive refractive power and in which the surface thereof toward the object side has a radius of curvature with a smaller absolute value than the surface thereof toward the image side, and a 2d lens having a negative refractive power;
   the third lens group consisting of, in order from the object side to the image side, a 3a lens having a negative refractive power and in which the surface thereof toward the object side has a radius of curvature with a smaller absolute value than the surface thereof toward the image side, and a 3b lens having a positive refractive power and in which the surface thereof toward the object side has a radius of curvature with a smaller absolute value than the surface thereof toward the image side; and
   the fourth lens group comprises, consecutively in order from the most object side thereof, a 4a lens of a positive meniscus shape, a stop, and a 4b lens having a positive refractive power and in which the surface thereof toward the object side has a radius of curvature with a smaller absolute value than the surface thereof toward the image side.

2. A zoom lens as defined in claim 1, wherein:
   the 2a lens and the 2b lens are cemented together.

3. A zoom lens as defined in claim 1, wherein:
   the 3a lens and the 3b lens are cemented together.

4. A zoom lens as defined in claim 1, in which Conditional Formula (1) below is satisfied:

$$0.3 < (r4af - r4ar)/(r4af + r4ar) < 0.9 \qquad (1)$$

wherein r4af is the radius of curvature of the surface toward the object side of the 4a lens, and r4ar is the radius of curvature of the surface toward the image side of the 4a lens.

5. A zoom lens as defined in claim 1, in which Conditional Formula (2) below is satisfied:

$$-3 < (r4bf + r4br)/(r4bf - r4br) < -1.2 \quad (2)$$

wherein r4bf is the radius of curvature of the surface toward the object side of the 4b lens, and r4br is the radius of curvature of the surface toward the image side of the 4b lens.

6. A zoom lens as defined in claim 1, in which Conditional Formula (3) below is satisfied:

$$0.2 < (r2bf + r2br)/(r2bf - r2br) < 0.8 \quad (3)$$

wherein r2bf is the radius of curvature of the surface toward the object side of the 2b lens, and r2br is the radius of curvature of the surface toward the image side of the 2b lens.

7. A zoom lens as defined in claim 1, in which Conditional Formula (4) below is satisfied:

$$-2.5 < (r2df - r2dr)/(r2df + r2dr) < -0.4 \quad (4)$$

wherein r2df is the radius of curvature of the surface toward the object side of the 2d lens, and r2dr is the radius of curvature of the surface toward the image side of the 2d lens.

8. A zoom lens as defined in claim 1, in which Conditional Formula (5) below is satisfied:

$$0.4 < f4/f4a < 1 \quad (5)$$

wherein f4 is the focal length of the fourth lens group with respect to the d line, and f4a is the focal length of the 4a lens with respect to the d line.

9. A zoom lens as defined in claim 1, in which Conditional Formula (6) below is satisfied:

$$1.5 < f4b/f4a < 3 \quad (6)$$

wherein f4b is the focal length of the 4b lens with respect to the d line, and f4a is the focal length of the 4a lens with respect to the d line.

10. A zoom lens as defined in claim 3, in which Conditional Formula (7) below is satisfied:

$$-0.2 < f3/r3ar \cdot ((1-n3a)/v3a + (n3b-1)/v3b) < -0.04 \quad (7)$$

wherein f3 is the focal length of the third lens group with respect to the d line, r3ar is the radius of curvature of the surface toward the image side of the 3a lens, n3a is the refractive index of the 3a lens with respect to the d line, v3a is the Abbe's number of the 3a lens with respect to the d line, n3b is the refractive index of the 3b lens with respect to the d line, and v3b is the Abbe's number of the 3a lens with respect to the d line.

11. A zoom lens as defined in claim 4, in which Conditional Formula (1-1) below is satisfied:

$$0.4 < (r4af - r4ar)/(r4af + r4ar) < 0.8 \quad (1\text{-}1).$$

12. A zoom lens as defined in claim 5, in which Conditional Formula (2-1) below is satisfied:

$$-2.5 < (r4bf + r4br)/(r4bf - r4br) < -1.4 \quad (2\text{-}1).$$

13. A zoom lens as defined in claim 6, in which Conditional Formula (3-1) below is satisfied:

$$0.45 < (r2bf + r2br)/(r2bf - r2br) < 0.6 \quad (3\text{-}1).$$

14. A zoom lens as defined in claim 7, in which Conditional Formula (4-1) below is satisfied:

$$-2 < (r2df - r2dr)/(r2df + r2dr) < -0.6 \quad (4\text{-}1).$$

15. A zoom lens as defined in claim 8, in which Conditional Formula (5-1) below is satisfied:

$$0.5 < f4/f4a < 0.85 \quad (5\text{-}1).$$

16. A zoom lens as defined in claim 9, in which Conditional Formula (6-1) below is satisfied:

$$1.8 < f4b/f4a < 2.5 \quad (6\text{-}1).$$

17. A zoom lens as defined in claim 10, in which Conditional Formula (7-1) below is satisfied:

$$-0.15 < f3/r3ar \cdot ((1-n3a)/v3a + (n3b-1)/v3b) < -0.06 \quad (7\text{-}1).$$

18. An imaging apparatus equipped with a zoom lens as defined in claim 1.

\* \* \* \* \*